US012755239B2

(12) United States Patent
MacLaughlin et al.

(10) Patent No.: US 12,755,239 B2
(45) Date of Patent: Oct. 6, 2026

(54) ITEM TRANSACTION MODELING ENGINE SYSTEMS AND METHODS

(71) Applicant: DeLorean Artificial Intelligence, Inc., Palm Beach, FL (US)

(72) Inventors: Severence M. MacLaughlin, Palm Beach, FL (US); Ram Prasad Bora, Palm Beach, FL (US); Dhiraj Sharma, Palm Beach, FL (US)

(73) Assignee: DeLorean Artificial Intelligence, Inc., Palm Beach, FL (US)

( * ) Notice: Subject to any disclaimer, the term of this patent is extended or adjusted under 35 U.S.C. 154(b) by 2 days.

(21) Appl. No.: 18/753,896

(22) Filed: Jun. 25, 2024

(65) Prior Publication Data

US 2025/0390836 A1 Dec. 25, 2025

(51) Int. Cl.
*G06Q 10/087* (2023.01)
*G06Q 10/083* (2024.01)

(52) U.S. Cl.
CPC .................................. *G06Q 10/087* (2013.01)

(58) Field of Classification Search
CPC ......................... G06Q 10/087; G06Q 30/0206
See application file for complete search history.

(56) References Cited

U.S. PATENT DOCUMENTS

| | | | |
|---|---|---|---|
| 5,966,126 | A | 10/1999 | Szabo |
| 8,548,937 | B2 | 10/2013 | Saigal et al. |
| 10,483,003 | B1 | 11/2019 | McNair et al. |
| 11,093,880 | B2 | 8/2021 | Anderson et al. |

(Continued)

FOREIGN PATENT DOCUMENTS

| | | | |
|---|---|---|---|
| CN | 105022740 | A | 11/2015 |
| CN | 106096657 | A | 11/2016 |

(Continued)

OTHER PUBLICATIONS

International Search Report and Written Opinion for International Application No. PCT/US2023/080231 dated Aug. 12, 2024, pp. 1-13.

(Continued)

*Primary Examiner* — Garcia Ade
(74) *Attorney, Agent, or Firm* — Pillsbury Winthrop Shaw Pittman LLP

(57) ABSTRACT

Techniques for item transactions including generating, based on structured transaction data indicative of values of an item over a time interval, a historical structured transaction dataset corresponding to the time interval, determining, based on the historical structured dataset, a set of historical directional values for the time interval; generating, based on unstructured transaction data comprising datasets published over the time interval, a historical unstructured transaction dataset corresponding to the time interval, determining numerical representations of the datasets; determining, based on the set of historical directional values and the numerical representations, a transaction model to determine a predicted direction of value for the item based on current structured and unstructured transaction data; determining, based on application of current structured and unstructured transaction data to the transaction model, a predicted direction of value for the item.

22 Claims, 6 Drawing Sheets

(56) References Cited

U.S. PATENT DOCUMENTS

| | | | |
|---|---|---|---|
| 11,093,884 B2 | 8/2021 | Devarakonda et al. | |
| 11,282,022 B2 | 3/2022 | Devarakonda et al. | |
| 11,514,379 B2 | 11/2022 | Adrian et al. | |
| 11,581,092 B1 | 2/2023 | McNair et al. | |
| 11,723,560 B2 | 8/2023 | Constantin et al. | |
| 11,790,412 B2 | 10/2023 | Pachauri et al. | |
| 2002/0143635 A1 | 10/2002 | Goodwin, III | |
| 2005/0234761 A1 | 10/2005 | Pinto et al. | |
| 2006/0085408 A1 | 4/2006 | Morsa | |
| 2006/0190310 A1 | 8/2006 | Gudla et al. | |
| 2007/0043609 A1 | 2/2007 | Imam et al. | |
| 2007/0043611 A1 | 2/2007 | Newman | |
| 2007/0112704 A1 | 5/2007 | Tomkins | |
| 2007/0288297 A1 | 12/2007 | Karras et al. | |
| 2010/0010878 A1 | 1/2010 | Pinto et al. | |
| 2010/0287059 A1 | 11/2010 | McCoy et al. | |
| 2011/0270646 A1 | 11/2011 | Prasanna et al. | |
| 2011/0295783 A1 | 12/2011 | Zhao | |
| 2012/0059779 A1 | 3/2012 | Syed et al. | |
| 2012/0284213 A1 | 11/2012 | Lin et al. | |
| 2013/0151311 A1 | 6/2013 | Smallwood | |
| 2014/0081738 A1 | 3/2014 | Abraham | |
| 2014/0101143 A1 | 4/2014 | Zhang | |
| 2014/0372351 A1 | 12/2014 | Sun | |
| 2016/0239808 A1 | 8/2016 | Ryu | |
| 2018/0060744 A1 | 3/2018 | Achin | |
| 2018/0218247 A1 | 8/2018 | Lee et al. | |
| 2018/0315141 A1 | 11/2018 | Hunn | |
| 2019/0116265 A1 | 4/2019 | Avila et al. | |
| 2019/0130425 A1 | 5/2019 | Lei et al. | |
| 2019/0139054 A1 | 5/2019 | Mathrubootham et al. | |
| 2019/0259043 A1 | 8/2019 | Koneri et al. | |
| 2019/0378074 A1 | 12/2019 | McPhatter et al. | |
| 2020/0184417 A1 | 6/2020 | Rosenfeld et al. | |
| 2020/0210922 A1 | 7/2020 | Devarakonda et al. | |
| 2020/0293946 A1 | 9/2020 | Sachan et al. | |
| 2021/0014136 A1 | 1/2021 | Rath | |
| 2021/0202103 A1 | 7/2021 | Bostic et al. | |
| 2021/0310075 A1 | 10/2021 | Maher et al. | |
| 2021/0390498 A1 | 12/2021 | Ohlsson et al. | |
| 2022/0263731 A1 | 8/2022 | Gupta et al. | |
| 2022/0358514 A1 | 11/2022 | Duff et al. | |
| 2023/0119881 A1* | 4/2023 | Makhija | G06Q 10/0835 705/28 |
| 2023/0177537 A1 | 6/2023 | MacLaughlin | |
| 2023/0307115 A1 | 9/2023 | Kumar et al. | |
| 2024/0054447 A1* | 2/2024 | Kwon | G06Q 10/083 |
| 2024/0177841 A1* | 5/2024 | Mamaghani | G16H 20/10 |
| 2024/0386372 A1* | 11/2024 | Vanbrocklin | G06Q 10/087 |
| 2025/0181592 A1* | 6/2025 | Khan | G06F 16/248 |
| 2025/0181602 A1* | 6/2025 | Khan | G06F 16/27 |

FOREIGN PATENT DOCUMENTS

| | | |
|---|---|---|
| CN | 107515898 A | 12/2017 |
| CN | 108520045 A | 9/2018 |
| JP | 2007-141036 A | 6/2007 |
| KR | 10-2018-0029593 A | 3/2018 |
| KR | 10-2020-0099284 A | 8/2020 |
| WO | 2020163381 A1 | 8/2020 |
| WO | 2020245727 A1 | 12/2020 |

OTHER PUBLICATIONS

International Search Report and Written Opinion for International Application No. PCT/US2023/080751 dated Aug. 20, 2024, pp. 1-11.
Office Action for Chinese Application No. 202080101992.0 dated Feb. 26, 2025, pp. 1-9.
International Search Report and Written Opinion for Int'l Application No. PCT/US2024/039962 dated Apr. 14, 2025, pp. 1-14.
Non-Final Office Action for U.S. Appl. No. 18/482,741 dated May 19, 2025, pp. 1-97.
Final Office Action for U.S. Appl. No. 18/516,354 dated Jun. 9, 2025, pp. 1-20.
Li, Dan, et al. "Machine learning-aided risk stratification system for the prediction of coronary artery disease." International Journal of Cardiology 326 (2021): 30-34. (Year: 2021).
Non-Final Office Action for U.S. Appl. No. 18/516,354 dated Dec. 17, 2024, pp. 1-31.
Final Office Action for U.S. Appl. No. 17/999,045 dated Feb. 12, 2025, pp. 1-29.
"LightGBM", Wikipedia.org, retrieved Nov. 16, 2023, pp. 1-3.
"Logistic regression", Wikipedia.org, retrieved Nov. 16, 2023, pp. 1-30.
"Long short-term memory", Wikipedia.org, retrieved Nov. 16, 2023, pp. 1-14.
"Machine learning", Wikipedia.org, retrieved Nov. 16, 2023, pp. 1-34.
"Naive Bayes classifier", Wikipedia.org, retrieved Nov. 16, 2023, pp. 1-12.
"Random forest", Wikipedia.org, retrieved Nov. 16, 2023, pp. 1-13.
"Support vector machine", Wikipedia.org, retrieved Nov. 16, 2023, pp. 1-13.
"Training, validation, and test data sets", retrieved Nov. 16, 2023, pp. 1-6.
"XGBoost", Wikipedia.org, retrieved Nov. 16, 2023, pp. 1-4.
"Artifical neural network", Wikipedia.org, retrieved Nov. 16, 2023, pp. 1-38.
"Autoregressive model", Wikipedia.org, retrieved Nov. 16, 2023, pp. 1-12.
"BERT (language model)", Wikipedia.org, retrieved Nov. 16, 2023, pp. 1-6.
"CatBoost", Wikipedia.org, retrieved Nov. 16, 2023, pp. 1-3.
"Decision tree learning", Wikipedia.org, retrieved Nov. 16, 2023, pp. 1-12.
"Decomposition of time series", Wikipedia.org, retrieved Nov. 16, 2023, pp. 1-3.
"Deep learning", Wikipedia.org, retrieved Nov. 16, 2023, pp. 1-45.
"Ensemble learning", Wikipedia.org, retrieved Nov. 16, 2023, pp. 1-15.
"Feedforward neural network", Wikipedia.org, retrieved Nov. 16, 2023, pp. 1-7.
"Gated recurrent unit", Wikipedia.org, retrieved Nov. 16, 2023, pp. 1-4.
"Gradient boosting", Wikipedia.org, retrieved Nov. 16, 2023, pp. 1-10.
"K-nearest neighbors algorithm", Wikipedia.org, retrieved Nov. 16, 2023, pp. 1-11.
"Cluster analysis", Wikipedia.org, retrieved Nov. 20, 2023, pp. 1-22.
International Search Report and Written Opinion received for PCT Patent Application No. PCT/US2020/034561, mailed on Jul. 28, 2020, pp. 1-11.
Extended European Search Report received for European Application No. 20938380.1, mailed on Nov. 30, 2023, pp. 1-5.
International Preliminary Report on Patentability for Application No. PCT/US2023/076284 dated Apr. 16, 2026, pp. 1-9.
Office Action for Chinese Application No. 202080101992.0 dated Jul. 30, 2025, pp. 1-9.
Office Action for Chinese Application No. 202080101992.0 dated Jan. 20, 2026, 1 page.
US Notice of Allowance for U.S. Appl. No. 17/999,045 dated Jun. 23, 2026, pp. 1-36.
International Preliminary Report on Patentability for Application No. PCT/US2023/080231 dated May 28, 2026, pp. 1-9.
International Preliminary Report on Patentability for Application No. PCT/US2023/080751.
P. Ongsulee, V. Chotchaung, E. Bamrungsi and T. Rodcheewit, "Big Data, Predictive Analytics and Machine Learning," 2018 16th International Conference on ICT and Knowledge Engineering (ICT &KE), Bangkok, Thailand, 2018, pp. 1-6.
Office Action for Chinese Application No. 202080101992.0 dated Jun. 10, 2026, pp. 1-11.

* cited by examiner

300

150

| Date | Daily Value |
|---|---|
| 1/13/2024 | 1.38 |
| 1/12/2024 | 1.35 |
| 1/11/2024 | 1.34 |
| 1/10/2024 | 1.29 |
| 1/9/2024 | 1.33 |
| 1/8/2024 | 1.29 |
| 1/7/2024 | 1.31 |
| 1/6/2024 | 1.37 |
| 1/5/2024 | 1.31 |
| 1/4/2024 | 1.35 |
| 1/3/2024 | 1.28 |
| 1/2/2024 | 1.25 |
| 1/1/2024 | 1.23 |

⋮

FIG. 3

300

| Date | Daily Value |
|---|---|
| 1/13/2024 | 1.38 |
| 1/12/2024 | 1.35 |
| 1/11/2024 | 1.34 |
| 1/10/2024 | 1.29 |
| 1/9/2024 | 1.33 |
| 1/8/2024 | 1.29 |
| 1/7/2024 | 1.31 |
| 1/6/2024 | 1.37 |
| 1/5/2024 | 1.31 |
| 1/4/2024 | 1.35 |
| 1/3/2024 | 1.28 |
| 1/2/2024 | 1.25 |
| 1/1/2024 | 1.23 |

⋮

1/9/2024 Trailing Average = 1.3275

1/9/2024 Leading Average = 1.3200

1/9/2024 Leading-Trailing Delta = 0.0075

FIG. 4

500

| Date | Daily Value | Leading Average (4 days) | Trailing Average (4days) | Leading-Trailing Delta | Label |
|---|---|---|---|---|---|
| 1/13/2024 | 1.38 | 1.328 | N/A | N/A | N/A |
| 1/12/2024 | 1.35 | 1.313 | N/A | N/A | N/A |
| 1/11/2024 | 1.34 | 1.305 | N/A | N/A | N/A |
| 1/10/2024 | 1.29 | 1.325 | 1.340 | 0.015 | Up |
| 1/9/2024 | 1.33 | 1.320 | 1.328 | 0.008 | Up |
| 1/8/2024 | 1.29 | 1.335 | 1.313 | -0.023 | Down |
| 1/7/2024 | 1.31 | 1.328 | 1.305 | -0.023 | Down |
| 1/6/2024 | 1.37 | 1.298 | 1.325 | 0.028 | Up |
| 1/5/2024 | 1.31 | 1.278 | 1.320 | 0.043 | Up |
| 1/4/2024 | 1.35 | 1.263 | 1.335 | 0.072 | Up |
| 1/3/2024 | 1.28 | 1.275 | 1.328 | 0.053 | Up |
| 1/2/2024 | 1.25 | 1.285 | 1.298 | 0.013 | Up |
| 1/1/2024 | 1.23 | 1.305 | 1.278 | -0.028 | Down |

⋮

FIG. 5

ITEM TRANSACTION MODELING ENGINE SYSTEMS AND METHODS

FIELD

Embodiments relate generally to exchange of items and more particularly to systems and methods for assessing and implementing item transactions.

BACKGROUND

Entities often engage in the purchase and disposition of items to minimize losses and maximize income. For example, a company that engages in the purchase and sale of an item, such as raw materials used for manufacture, may take steps to purchase the item at times when the item has a relatively low price or to sell the item at times when the item has a relatively high price. Central to this endeavor is the timely identification of favorable buying or selling opportunities, and one aspect of successful decision-making is the accurate assessment of the intrinsic value of an item relative to its market price.

SUMMARY

In many instances, transaction decisions rely on fundamental analysis, technical analysis, and expert judgment to evaluate potential value of items that are the subject of the transaction. This can involve assessing underlying factors that influence the value of an item, and analyzing historical price and volume data to identify patterns and trends that may indicate future value fluctuations. While these methods can be effective to some extent, they often rely on subjective interpretations and may fail to capture complexities of market dynamics.

Provided are embodiments for accurately assessing and implementing item transactions. For example, certain embodiments employ historical structured and unstructured data to model and predict item values which can, in turn, be used as a basis for acquiring or divesting of items. In some embodiments, a transaction engine is operable to generate a transaction model based on historical structured and unstructured data, such as observed prices for the item at different points in time across a period of time and media content published during the period of time, where the historical structured and unstructured data is used to train the transaction model. The transaction engine is further operable to apply current structured and unstructured data, such as recent prices for the item and recently published media content, to the transaction model to generate a prediction of a value of the item, such as a predicted fluctuation in price in the near future. For example, daily prices for an item over the course of a year (e.g., including prices and dates in a structured format) and news articles published over the year (e.g., including unstructured textual content) may be used to train a transaction model for the item, and current pricing for the item on or around a given day and news articles published on or around that day may be applied to the trained transaction model for the item to generate a predicted trend (or "direction") for the price of the item (e.g., the price of the item is expected to increase, decrease, or remain the same over the next four days). If for example, the price of the item is expected to trend upward (or "increase"), a transaction may be executed to purchase the item now and sell the item at an end of the predicted trend. If for example, the price of the item is expected to trend downward (or "decrease"), a transaction may be executed to sell the item now and purchase the item at the end of the predicted trend. If for example, the price of the item is expected to trend unchanged (or "flat"), a transaction may not be executed to purchase/sell the item based on the prediction.

In some embodiments, a transaction engine is operable to perform the following operations for generating a transaction model for use in executing transactions of items: (1) obtaining model training data that includes (a) structured transaction data indicative of values for the item over a time interval of interest from a structured transaction data source (e.g., obtain item price history from a market report website), and (b) unstructured transaction data that includes textual data published over the time interval of interest from an unstructured transaction data source (e.g., obtain online news articles, social media post, or other digital media from online content providers, such as news agencies, social media sites, or the like); (2) generating (e.g., based on the structured transaction data) a historical structured dataset corresponding to the time interval of interest that includes timeseries data including a value for the item for each of a plurality of discrete points in time across the time interval of interest (e.g., a time series listing of historical daily prices for the item over the last year); (3) determining (e.g., based on the historical structured dataset) a set of historical directional values for the time interval of interest that include, for some or all of each of the plurality of discrete points in time, a directional value that is indicative of a trend of the value for the item for a corresponding time interval, such as a time interval that extends from a given leading time before the discrete point in time to a given trailing time after the discrete point in time (e.g., for each of days over the last year, an average of the price of the four preceding days (or "leading average") and an average of the price for the day and the three days following (or "trailing average"), where an associated trend for the day is positive/negative if the trailing average is greater/less than the leading average); (4) generating (e.g., based on the unstructured transaction data) a historical unstructured dataset corresponding to the time interval of interest that includes textual datasets published over the time interval of interest and associated with one or more of the discrete points in time (e.g., for each of some or all of the days over the last year, sets of online news articles, social media post, or other digital media published on those days and including unstructured textual content, such as written commentary); (5) determining, for each of some or all of the textual datasets of the textual datasets, a numerical representation of the textual dataset (e.g., for each textual dataset of the textual datasets, preprocessing the textual dataset to generate a "cleaned" textual dataset and vectorizing the "cleaned" textual dataset to generate a vector representation of the textual dataset); (6) determining (e.g., based on the set of historical directional values and the numerical representations of the textual datasets) a transaction model operable to determine predicted direction of value for the item based on current structured transaction data or current unstructured transaction data (e.g., a transaction model that is operable to apply a recent set of prices for the item and a set of vectors for recent digital media to generate a predicted trend (or "direction") for the price of the item, such as whether the price of the item is expected to increase, decrease, or remain the same over the next four days). In certain embodiments, the transaction engine is operable to perform the following operations for employing a trained transaction model for use in executing transactions of items: (1) obtaining a current transaction dataset that incudes (a) a current structured transaction dataset associated with a given point in time (e.g., a recent set of prices for the item) and (b) a current unstructured transaction dataset associated with the given point in time (e.g., a set of vectors for recent digital media); and (2) apply the current structured transaction dataset and the current unstructured transaction dataset to the transaction model to determine a predicted direction of value for the item for the given point in time (e.g., a predicted trend (or "direction") for the price of the item, such as whether the price of the item is expected to increase, decrease, or remain the same over the next four days). In certain embodiments, the transaction engine is operable to perform the following operations for employing a predicted direction of value for an item in executing transactions of items: (a) executing (based on the predicted direction of value for the item for the given point in time) a transaction to acquire or divest of the item. For example, (a) if the predicted direction of value for the item is "up" (or "increase"), executing a transaction to purchase the item now or sell the item at an end of the predicted trend based on the prediction, (b) if the predicted direction of value for the item is "down" (or "decrease"), executing a transaction to sell the item now or purchase the item at an end of the predicted trend based on the prediction, or (c) if the predicted direction of value for the item is "no change" (or "flat"), refrain from executing a transaction to purchase/sell the item now based on the prediction.

BRIEF DESCRIPTION OF THE DRAWINGS

FIG. 3 is a table that illustrates structured data in accordance with one or more embodiments.

FIG. 4 is a diagram that illustrates assessment of structured data in accordance with one or more embodiments.

FIG. 5 is a diagram that illustrates labeled structured data in accordance with one or more embodiments.

Figure 1:
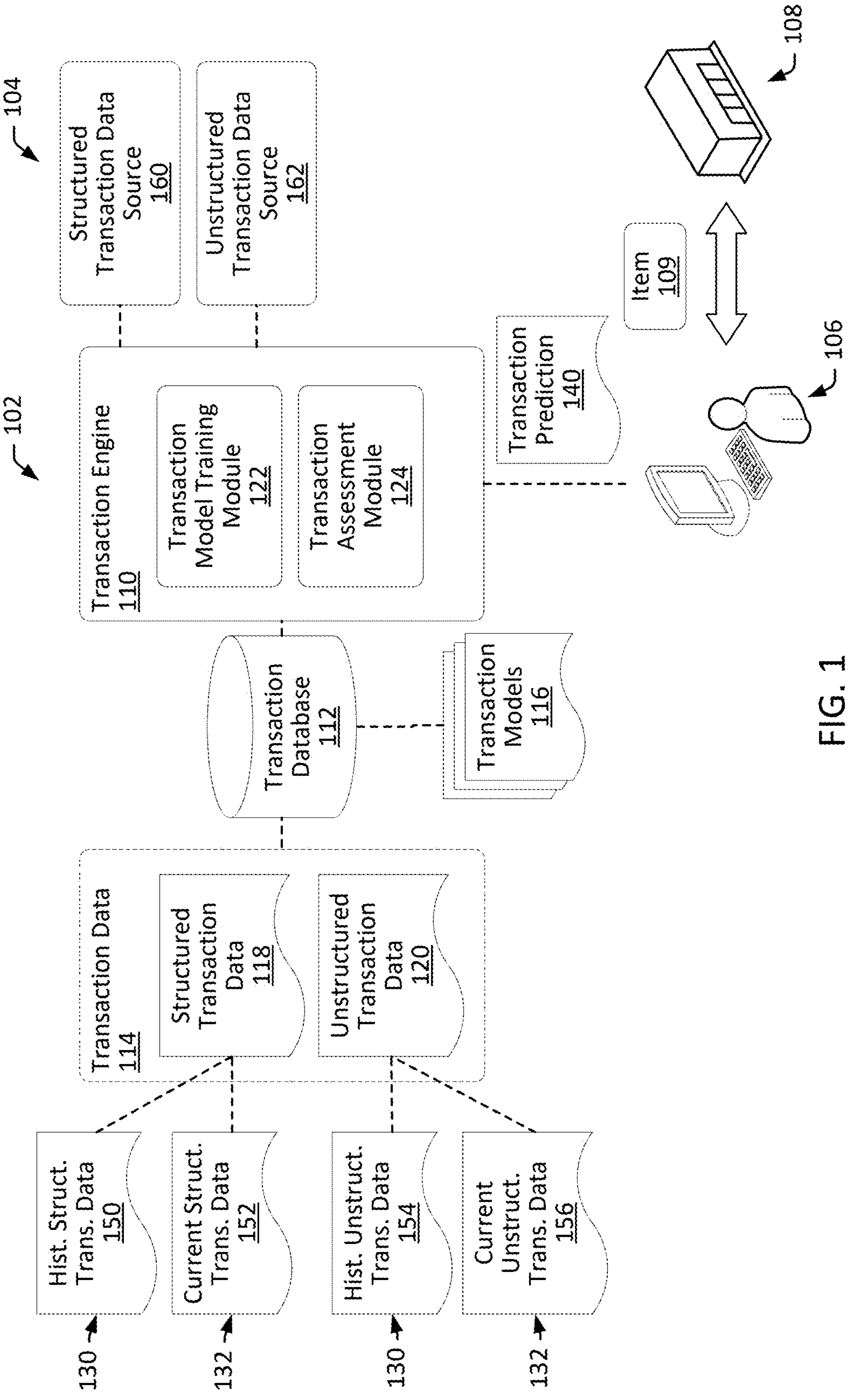
FIG. 1 is diagram that illustrates an item transaction environment in accordance with one or more embodiments.

While this disclosure is susceptible to various modifications and alternative forms, specific example embodiments are shown and described. The drawings may not be to scale. It should be understood that the drawings and the detailed description are not intended to limit the disclosure to the particular form disclosed, but are intended to disclose modifications, equivalents, and alternatives falling within the spirit and scope of the present disclosure as defined by the claims.

DETAILED DESCRIPTION

Provided are embodiments for accurately assessing and implementing item transactions. For example, certain embodiments employ historical structured and unstructured data to model and predict item values which can, in turn, be used as a basis for acquiring or divesting of items. In some embodiments, a transaction engine is operable to generate a transaction model based on historical structured and unstructured data, such as observed prices for the item at different points in time across a period of time and media content published during the period of time, where the historical structured and unstructured data is used to train the transaction model. The transaction engine is further operable to apply current structured and unstructured data, such as recent prices for the item and recently published media content, to the transaction model to generate a prediction of a value of the item, such as a predicted fluctuation in price in the near future. For example, daily prices for an item over the course of a year (e.g., including prices and dates in a structured format) and news articles published over the year (e.g., including unstructured textual content) may be used to train a transaction model for the item, and current pricing for the item on or around a given day and news articles published on or around that day may be applied to the trained transaction model for the item to generate a predicted trend (or "direction") for the price of the item (e.g., the price of the item is expected to increase, decrease, or remain the same over the next four days). If for example, the price of the item is expected to trend upward (or "increase"), a transaction may be executed to purchase the item now and sell the item at an end of the predicted trend. If for example, the price of the item is expected to trend downward (or "decrease"), a transaction may be executed to sell the item now and purchase the item at the end of the predicted trend. If for example, the price of the item is expected to trend unchanged (or "flat"), a transaction may not be executed to purchase/sell the item based on the prediction.

In some embodiments, a transaction engine is operable to perform the following operations for generating a transaction model for use in executing transactions of items: (1) obtaining model training data that includes (a) structured transaction data indicative of values for the item over a time interval of interest from a structured transaction data source (e.g., obtain item price history from a market report website), and (b) unstructured transaction data that includes textual data published over the time interval of interest from an unstructured transaction data source (e.g., obtain online news articles, social media post, or other digital media from online content providers, such as news agencies, social media sites, or the like); (2) generating (e.g., based on the structured transaction data) a historical structured dataset corresponding to the time interval of interest that includes timeseries data including a value for the item for each of a plurality of discrete points in time across the time interval of interest (e.g., a time series listing of historical daily prices for the item over the last year); (3) determining (e.g., based on the historical structured dataset) a set of historical directional values for the time interval of interest that include, for some or all of each of the plurality of discrete points in time, a directional value that is indicative of a trend of the value for the item for a corresponding time interval, such as a time interval that extends from a given leading time before the discrete point in time to a given trailing time after the discrete point in time (e.g., for each of days over the last year, an average of the price of the four preceding days (or "leading average") and an average of the price for the day and the three days following (or "trailing average"), where an associated trend for the day is positive/negative if the trailing average is greater/less than the leading average); (4) generating (e.g., based on the unstructured transaction data) a historical unstructured dataset corresponding to the time interval of interest that includes textual datasets published over the time interval of interest and associated with one or more of the discrete points in time (e.g., for each of some or all of the days over the last year, sets of online news articles, social media post, or other digital media published on those days and including unstructured textual content, such as written commentary); (5) determining, for each of some or all of the textual datasets of the textual datasets, a numerical representation of the textual dataset (e.g., for each textual dataset of the textual datasets, preprocessing the textual dataset to generate a "cleaned" textual dataset and vectorizing the "cleaned" textual dataset to generate a vector representation of the textual dataset); (6) determining (e.g., based on the set of historical directional values and the numerical representations of the textual datasets) a transaction model operable to determine predicted direction of value for the item based on current structured transaction data or current unstructured transaction data (e.g., a transaction model that is operable to apply a recent set of prices for the item and a set of vectors for recent digital media to generate a predicted trend (or "direction") for the price of the item, such as whether the price of the item is expected to increase, decrease, or remain the same over the next four days). In certain embodiments, the transaction engine is operable to perform the following operations for employing a trained transaction model for use in executing transactions of items: (1) obtaining a current transaction dataset that incudes (a) a current structured transaction dataset associated with a given point in time (e.g., a recent set of prices for the item) and (b) a current unstructured transaction dataset associated with the given point in time (e.g., a set of vectors for recent digital media); and (2) apply the current structured transaction dataset and the current unstructured transaction dataset to the transaction model to determine a predicted direction of value for the item for the given point in time (e.g., a predicted trend (or "direction") for the price of the item, such as whether the price of the item is expected to increase, decrease, or remain the same over the next four days). In certain embodiments, the transaction engine is operable to perform the following operations for employing a predicted direction of value for an item in executing transactions of items: (a) executing (based on the predicted direction of value for the item for the given point in time) a transaction to acquire or divest of the item. For example, (a) if the predicted direction of value for the item is "up" (or "increase"), executing a transaction to purchase the item now or sell the item at an end of the predicted trend based on the prediction, (b) if the predicted direction of value for the item is "down" (or "decrease"), executing a transaction to sell the item now or purchase the item at an end of the predicted trend based on the prediction, or (c) if the predicted direction of value for the item is "no change" (or "flat"), refrain from executing a transaction to purchase/sell the item now based on the prediction.

Although certain example embodiments are described in the context of transactions involving the purchase of items, such as a currency product purchased/sold on a foreign exchange market, embodiments may be employed in any suitable context, such as for the acquisition or divestiture of other types of items, including other financial instruments or assets, such as commodities, goods, services, or the like. Moreover, although certain embodiments are described in the context of certain types of publicly available unstructured data, such as text of published news articles, embodiments may employ various types of unstructured data obtained from various sources, such as published text, images, video, audio, or the like.

FIG. 1 is a diagram that illustrates an item transaction environment ("environment") 100 in accordance with one or more embodiments. In the illustrated embodiment, environment 100 includes a transaction management system ("management system") 102, transaction data sources ("data sources") 104, a transaction operator ("operator") 106, and a transaction environment 108 that, for example, facilitates transactions involving an item 109. The management system 102 includes a transaction engine 110 and a transaction database 112 storing transaction data 114, including structured transaction data 118 and unstructured transaction data 120. The transaction engine 110 includes a transaction model training module ("training module") 122 and transaction assessment module 124.

In some embodiments, management system 102 includes one or more entities that are operable to determine transaction predictions 140 based on assessment of associated transaction data 114 obtained from one or more transaction data sources 104. In some embodiments, management system 102 includes a computer system that is the same or similar to that of computer system 1000 described with regard to at least FIG. 9. In some embodiments, management system 102 is operable to generate one or more transaction models 116 based on historical structured transaction data 118 (e.g., observed prices for item 109 at different points in time across a time interval) and historical unstructured transaction data 120 (e.g., media content published during the time interval) and employing one or more transaction models 116 to generate transaction predictions 140. This may include, for example, training module 122 being operable to train a transaction model 116 for item 109 based on historical structured and unstructured transaction data 150 and 154, and transaction assessment module 124 operable to apply current structured transaction data 152 (e.g., recent prices for item 109 at different points in time across a time interval) and current unstructured transaction data 156 (e.g., recently published media content) to the trained transaction model 116 to generate a transaction prediction 140 that indicates a predicted trend (or "direction") of the value of item 109 in the near future. For example, daily prices for item 109 over the course of a year (e.g., including prices and dates in a structured format) and news articles, social media posts, or the like published over the year (e.g., including unstructured textual content, such as written commentary) may be obtained and stored in transaction data 114 of transaction database 112 and be used (e.g., by training module 122) to train a transaction model 116 for item 109. Current pricing for item 109 on or around a given day and news articles, social media posts, or the like published on or around that same day may be obtained and stored in transaction data 114 of transaction database 112 and be applied to the trained transaction model 116 for item 109 (e.g., by assessment module 124 module 122) to generate transaction prediction 140 that includes a predicted trend (or "direction") for the price of item 109 over the next four days (e.g., a prediction that the price of the item 109 is expected to increase, decrease, or remain the same over the next four days). A transaction for item 109 may, for example, be executed (e.g., in transaction environment 108 by operator 106) based on a transaction prediction 140. If for example, the price of item 109 is forecast to trend upward (or "increase"), a transaction may be executed to purchase item 109 now or sell item 109 at an end of the predicted trend. If for example, the price of item 109 is forecast to trend downward (or "decrease"), a transaction may be executed to sell item 109 now or purchase item 109 at an end of the predicted trend. If for example, the price of item 109 is forecast to trend unchanged (or "flat"), a transaction may not be executed to purchase/sell item 109 now. Such a transaction for item 109 may be carried out by operator 106 (or a similar entity) conducting transactions for item 109 in transaction environment 108.

In an example embodiment, item 109 includes a currency (e.g., Mexican pesos (MXN)) traded in a currency exchange of transaction environment 108 (e.g., a foreign currency exchange ("forex" of "FX") market trading platform). In such an embodiment, operator 106 may be a transaction broker (e.g., a forex broker), and in response to receiving a request by a purchaser (e.g., transaction engine 110 or other entity) to purchase (or "trade") a given currency, operator 106 may place an order in the currency exchange of transaction environment 108 (e.g., place a request to purchase 130 Mexican pesos (MXN) using $100 US dollars (USD) and at an exchange rate (or "price") of 1.3 MXN/USD). In response to the order, the currency exchange of transaction environment 108 may execute the purchase and transfer ownership of purchased item 109 to the purchaser (e.g., the forex market may execute the purchase and transfer ownership of 130 MXN to the purchaser). In a sales transaction, the exchange may work in the opposite way, from a seller's perspective.

In some embodiments, structured transaction data 118 is data that is organized and formatted in a specific and predefined manner, for example, making it readily searchable, analyzable, and understandable by machines. Structured transaction data 118 may have a defined format, such as being organized into a tabular format, where each data point is stored in a separate field or column, and rows represent individual records or observations. Structured transaction data 118 may have consistency and uniformity, with clearly defined data types, relationships, and constraints. In some embodiments, structured transaction data 118 is organized into a well-defined format, such as a table, spreadsheet, or database schema, with, for example, each piece of data is stored in a field with a specific data type (e.g., text, number, date) and follows a consistent structure across all records. Structured transaction data 118 may be associated with a schema that defines the structure, constraints, and relationships within the data, with, for example, the schema specifying the names and data types of each field, as well as any rules or constraints that govern the data's organization and integrity. Structured transaction data 118 may be highly queryable, meaning that it can be easily searched, filtered, and sorted using database query languages (e.g., SQL), which, for example, may allow users to retrieve specific subsets of data based on criteria such as value matching, range queries, or logical conditions. Structured transaction data 118 may be relational, having relationships between different entities or tables within a database, where, for example, these relationships are defined by keys or identifiers that link related records together, enabling complex queries and analyses across multiple tables. Structured transaction data 118 may be scalable, being able to scale to handle large volumes of information efficiently, such as with modern database management systems (DBMS) that are designed to manage terabytes or even petabytes of structured data while providing fast query performance and data integrity. Structured transaction data 118 may be interoperable, lending itself well to interoperability with other systems and applications, with, for example, use of standardized formats and protocols (e.g., CSV, JSON, XML) that facilitate the exchange of structured data between different platforms and tools, enabling seamless integration and data sharing.

In some embodiments, structured transaction data 118 includes observed prices for an item at different points in time across a defined time interval. For example, structured transaction data 118 for item 109 may include daily closing prices for item 109 over the course of a number of years (e.g., from Jan. 14, 2010 to Jan. 13, 2024), including the prices and dates arranged in a structured format, such as a column/row format. This may include, for example, daily pricing information for item 109 arranged in a column/row format with a first column being a date attribute, a second column being price attribute, with each row representing a given day, with the first column in the row representing a given date value for the date attribute and the second column of the same row being a given price value for the value attribute.

In some embodiments, transaction data 114 includes historical transaction data 130. Historical transaction data 130 may include, for example, timeseries data that includes data associated with a historical time interval of interest, such as a last year. In some embodiments, transaction data 118 includes current transaction data 132. Current transaction data 132 may include, for example, timeseries data that includes data associated with a recent time interval of interest (e.g., a significantly shorter than the historical time interval of interest, e.g., less than 25%, 10%, 5%, 1%, 0.5% or the like thereof), such as a last day or most recent set of several days of the last year. In some embodiments, historical transaction data 130 includes historical structured transaction data 150 and historical unstructured transaction data 154. In some embodiments, current transaction data 132 includes current structured transaction data 152 and current unstructured transaction data 156.

In some embodiments, historical structured transaction data 150 includes timeseries data that includes a value for item 109 for each of a plurality of discrete points in time across a time interval of interest. For example, a subset of structured transaction data 118 may be historical structured data 150 that includes an observed closing price for item 109 for each day of the past year. In some embodiments, current structured transaction data 152 includes timeseries data that includes a value for item 109 for one or more recent discrete points in time. For example, a subset of structured transaction data 118 may be current structured transaction data 152 that includes an observed closing price for item 109 for a most recent (or "last") day or a set of recent days (e.g., observed closing prices for item 109 for each of the last four days).

FIG. 3 is a table diagram that illustrates structured data 300 in accordance with one or more embodiments. In the illustrated embodiment, structured data 300 includes historical structured transaction data 150 that includes daily pricing information for item 109 arranged in a tabular format, including a columns and rows with each column representing a respective attribute and each rows representing a representative sets of values for the attributes. The first column, labeled "Date," represents the date of each observation. Each row corresponds to a specific day (e.g., with the date format typically following the MM/DD/YYYY convention for clarity and consistency). The second column, labeled "Price," represents the price of item 109 (e.g., the recorded price for item 109 at the close of business/trading) on the corresponding date. Each row contains the price value for item 109 on the specific day indicated in the first column. Additional rows can be included to represent pricing information for each consecutive day, with each row providing a new observation of the price for item 109 on a specific date. Such a tabular format may allow for easy organization and analysis of daily pricing data for item 109, which may, for example, facilitate tasks such as calculating averages, identifying trends, detecting anomalies, and conducting timeseries analyses to understand the behavior of price fluctuations for item 109 over time. For example, such formatting of structured data 300 may provide for determinations of leading and trailing averages, and associated differences (or "deltas") for respective dates (e.g., leading-trailing deltas as described here with regard to at least FIG. 4), as well as associated directional labels (or "trend labels") for respective dates (e.g., labels of "Up" or "Down" as described here with regard to at least FIG. 5).

In some embodiments, unstructured transaction data 120 is data that lacks a predefined data model or organizational structure. Unlike structured data (e.g., organized into rows and columns with a clear schema), unstructured data may not conform to any specific format or organization. Instead, it may exist in a variety of formats and contain a wide range of content, including text, images, video, audio, or the like. Unstructured transaction data 120 may not adhere to a predefined schema or structure. For example, unstructured transaction data 120 may be stored in files, documents, or multimedia files without any consistent formatting or organization. Unstructured transaction data 120 may have varied format, for example, taking one or more of many different forms, including plain text, PDF documents, emails, social media posts, images, audio recordings, video files, and more, with different types of data having its own unique format and characteristics. Unstructured transaction data 120 may be semantically complex, for example, containing rich semantic content, such as natural language text, which may be highly nuanced, context-dependent, and ambiguous, which can, in turn, present challenges for understanding and analyzing unstructured data using traditional methods. Unstructured transaction data 120 may have a relatively large volume, for example, constituting a significant portion of the total data generated and stored by organizations, including text documents, email archives, social media feeds, and multimedia files, which can accumulate in large volumes over time. Unstructured transaction data 120 may exhibit limited queryability. Unlike structured data, which is relatively highly queryable using database query languages, unstructured data may be less amenable to direct querying and analysis. For example, extracting meaningful insights from unstructured data may benefit from advanced text processing, natural language processing (NLP), image recognition, or other techniques. Unstructured transaction data 120 may be a suitable subject for semantic analysis, including extracting and understanding the underlying semantics, context, and meaning of the content. This may include tasks such as sentiment analysis, entity recognition, topic modeling, and document classification. While unstructured transaction data 120 may require specialized tools and techniques for analysis, it may contain insights that can complement and enrich structured transaction data 118, by, for example, providing enhanced comprehension and understanding of complex real-world phenomena associated with the structured transaction data 118.

In some embodiments, unstructured transaction data 120 includes media content published during a defined time interval. For example, unstructured transaction data 120 may include media content (e.g., text, images, audio, video, and multimedia presentations) published over the course of the same years as the structured transaction data (e.g., Jan. 14, 2010 to Jan. 13, 2024), including unstructured content. This may include, for example, news articles published on news organizations' websites and having journalist authored commentary, social media posts published on social media outlets and having user authored commentary, blog posts published on blog web pages of the Internet and having bogger authored commentary, user authored comments published in response to media content, or the like. For example, unstructured transaction data 120 may include all, or a subset of, news articles published online by one or more news outlets (and associated user comments therefore) from Jan. 14, 2010 to Jan. 13, 2024, and all, or a subset of, X, Instagram, or Facebook posts over that same interval of time.

In some embodiments, historical unstructured transaction data 154 includes timeseries data that includes published content associated with discrete points in time across a time interval of interest. For example, a subset of unstructured transaction data 120 may be news articles and social media posts published over the past year. In some embodiments, current unstructured transaction data 156 includes published content associated with one or more recent discrete points in time. For example, a subset of unstructured transaction data 120 may be current unstructured transaction data 156 that includes news articles and social media posts published over on a most recent (or "last") day or a set of recent days (e.g., news articles and social media posts published over the last four days).

In some embodiments, transaction data sources ("data sources") 104 includes one or more entities that are operable to provide transaction data 114. For example, data sources 104 may include websites (and associated servers and databases) that are operable to provide respective sets of media content or other electronic content. In some embodiments, data sources 104 include one or more structured transaction data sources 160. Structured transaction data sources 160 may include data sources 104 that are operable to provide respective sets of structured transaction data 118. For example, structured transaction data sources 160 may include a market website that provides a daily closing price for item 109. In such an embodiment, transaction engine 110 may, for example, query or scrape the market website daily to obtain daily closing prices for item 109, and store associated structured data in transaction data 114. In some embodiments, data sources 104 include one or more unstructured transaction data sources 162. Unstructured transaction data sources 162 may include data sources 104 that are operable to provide respective sets of unstructured transaction data 120. For example, unstructured transaction data sources 162 may include news organizations' websites, social media outlets and having user authored commentary, blog webpages, or the like. In such an embodiment, transaction engine 110 may, for example, query or scrape the news organizations' websites, social media outlets, blog webpages, or the like to obtain daily articles, social media posts, blog commentary, user comments, or the like, and store associated unstructured data in transaction data 114. In some embodiments, one or more of data sources 104, such as one or more of structured transaction data sources 160 or unstructured transaction data sources 162, includes a computer system that is the same or similar to that of computer system 1000 described with regard to at least FIG. 9.

In some embodiments, transaction operator ("operator") 106 includes one or more entities that are operable to execute a transaction or cause execution of a transaction. For example, operator 106 may be a broker that operates as a financial intermediary to facilitate the buying and selling of currencies on behalf of clients. Operator 106 may, for example, initiate the purchase or sale of item 109 in transaction environment 108. In the context of brokering currency traded in a currency exchange transaction environment 108 (e.g., a forex platform), operator 106 may be a transaction broker (e.g., a forex broker). In response to receiving a request by a purchaser to purchase (or "trade") a given currency (e.g., a transaction prediction 140 from transaction engine 110 other entity that is indicative of a positive value prediction for MXN), operator 106 may place an order in the currency exchange transaction environment 108 (e.g., place a request to purchase 130 Mexican pesos (MXN) using $100 US dollars (USD) using at an exchange rate (or "price") of 1.3 MXN/USD). In some embodiments, operator 106 includes a computer system that is the same or similar to that of computer system 1000 described with regard to at least FIG. 9.

In some embodiments, transaction environment 108 includes one or more entities that are operable to facilitate transactions for item 109. Continuing with the above example regarding currency, transaction environment 108 may, for example, be a foreign exchange (forex) platform for trading (e.g., buying or selling) currency type items 109, such as Mexican pesos (MXN), US dollars (USD), or the like based on associated relative values of the items 109, such as corresponding exchange rates. In some embodiments, transaction environment 108 includes a computer system that is the same or similar to that of computer system 1000 described with regard to at least FIG. 9.

Figure 2:
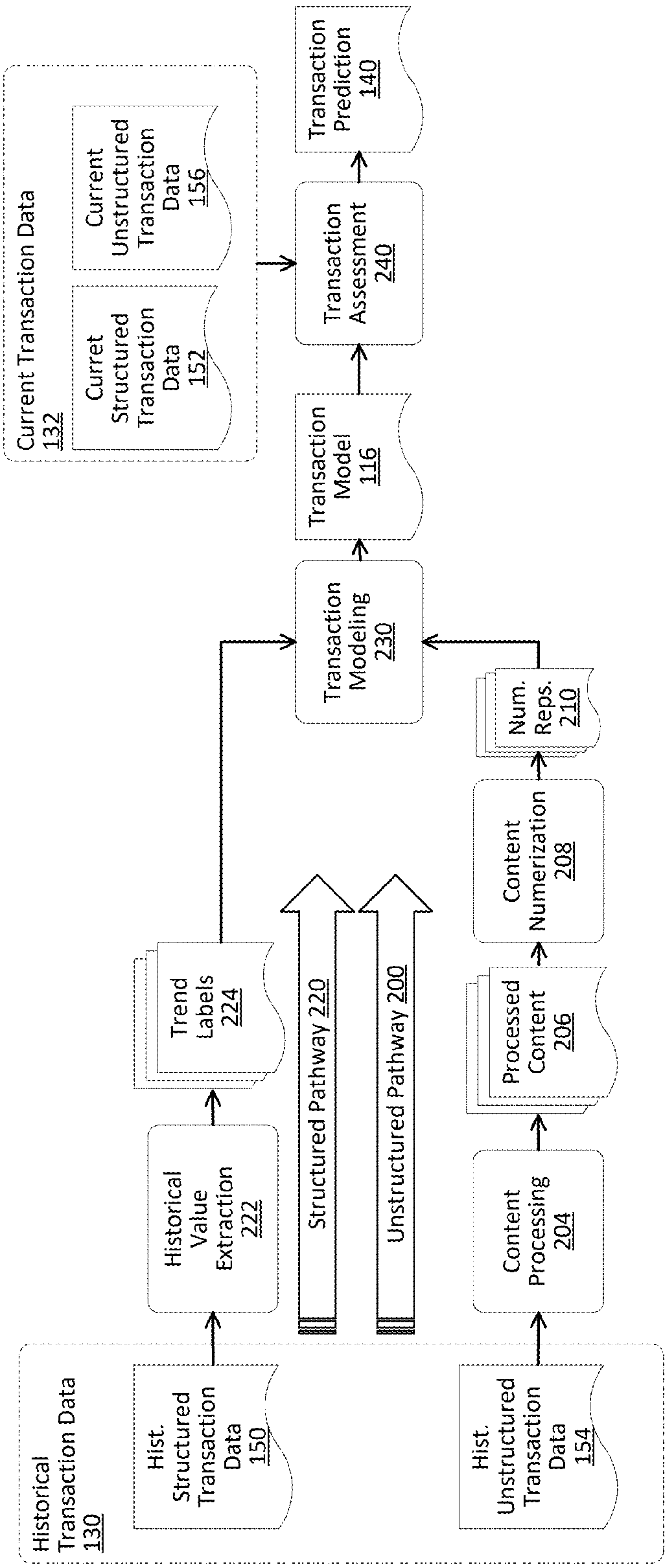
FIG. 2 is flow diagram that illustrates operational aspects of a transaction system in accordance with one or more embodiments.

FIG. 2 is flow diagram that illustrates operational aspects of transaction management system 102 in accordance with one or more embodiments. In the illustrated embodiment, historical unstructured transaction data 154 is processed along an "unstructured" pathway 200 that includes conducting a content pre-processing 204 to generate preprocessed content 206 and conducting a content numeration 208 to generate numeric representations 210 (e.g., vectors) for respective subsets of historical unstructured data 154. Further, historical structured transaction data 150 is processed along a "structured" pathway 220 that includes conducting a historical value extraction 222 to generate trend labels 224 for respective subsets of historical structured transaction data 150. A transaction modeling operation 230 is conducted using generated numeric representations 210 and trend labels 224 to generate a corresponding transaction model 116. A transaction assessment operation 240 is conducted, including application of current structured transaction data 152 and current unstructured transaction data 156 to the generated transaction model 116, to generate a transaction prediction 140, which may, for example, indicate a predicted trend of a value (e.g., a price) of item 109 which may, in turn, be used as a basis for conducting or not conducting a transaction involving item 109.

In some embodiments, content pre-processing 204 includes processing of historical unstructured transaction data for a time interval of interest to generate corresponding processed (or "cleaned") data. For example, where historical unstructured transaction data 154 includes all news articles published online by one or more news outlets (and associated user comments therefore) from Jan. 14, 2010 to Jan. 13, 2024, and transaction modeling 230 is to be accomplished on Jan. 1, 2024 using a most recent seven years of historical unstructured transaction data 154, historical unstructured training data 202 may include a subset of historical unstructured transaction data 154 that includes all 66,500 news articles published online by one or more news outlets (and associated user comments therefore) from Jan. 1, 2017 to Dec. 31, 2023, with each piece of media content being represented by a respective electronic document of information (e.g., an electronic document including the text of the associated article and being associated with a date of publication). In some embodiments, content pre-processing 204 of a set of a document of unstructured transaction data includes conducting a document preprocessing operation that includes, for example, converting text of the document to lowercase to generate lower case text, removing any non-alphanumeric characters from the lowercase text to generate lower case and non-alphanumeric text, splitting sentences of the lower case and non-alphanumeric text into words to generate tokenized text, removing words less than a given number of characters (e.g., less than 3 characters) to generate tokenized character basis text, and rejoining words of the tokenized character basis text to generate a clean sentence form of the text of the document. Converting text to lowercase (e.g., converting all the text in the document to lowercase) may ensures that words are treated uniformly regardless of their original casing. Removing non-alphanumeric characters (e.g., removing any characters that are not letters or numbers from the lowercase text) may include removing punctuation marks, special symbols, and any other non-alphanumeric characters. Splitting sentences into words (e.g., splitting the text into individual words after removing non-alphanumeric characters), sometimes referred to as "tokenization," may separate the text into meaningful units (words) based on spaces between them. Removing short words (e.g., removing words that are shorter than a specified number of characters e.g., less than 3 characters) from the tokenized text can help filter out very short and often irrelevant words like "a", "an", "the", etc. Rejoining words (e.g., rejoining the remaining words to form clean sentences), may involve putting the words back together in the original order, separated by spaces, to reconstruct the text in a readable sentence form. Continuing with the prior example, by following some or all of these preprocessing steps, the document text of each of the 66,500 news articles published online by one or more news outlets (and associated user comments therefore) from Jan. 1, 2017 to Dec. 31, 2023 may be transformed into a respective set of pre-processed content (or "clean content") 206, including cleaned versions of documents, each associated with their respective dates of publication. Such document content may be cleaner and more standardized format, which can be further analyzed or used for natural language processing tasks like text classification, sentiment analysis, and more. A document may be, for example, a subset of content 206 (e.g., one article of a set of articles), and a clean document may be a subset of clean content 206.

In some embodiments, content numeration 208 includes processing pre-processed content (such as "clean documents") to generate corresponding numerical representations thereof. For example, content numeration 208 may include conducting a vectorization of each "cleaned document" of processed content 206 to generate a corresponding numerical representation 210 for the document that includes a corresponding set of document vectors to be associated with the date associated with the document. This may result in a set of numerical representations 210 for the processed content 206, including, for example, vectors representing the cleaned documents. In some embodiments, vectorization includes creating a vocabulary consisting of unique words for cleaned documents 206, and applying a vectorization technique (e.g., One-Hot Encoding, TF-IDF (Term Frequency-Inverse Document Frequency), Word2Vec, Doc2Vec, or Bag-of-Words (BoW)), to generate a corresponding vector representation for the document. Vectorization using One-Hot Encoding may, for example, include each document represented as a binary vector where each element corresponds to the presence or absence of a word from the vocabulary in that document. For example, if the vocabulary consists of ["apple", "banana", "orange"], and a document contains the text "apple banana", its one-hot encoded representation would be [1, 1, 0] because it has both "apple" and "banana". Vectorization using TF-IDF (Term Frequency-Inverse Document Frequency) may include each document represented as a vector where each element corresponds to the TF-IDF score of a word from the vocabulary in that document. TF-IDF considers both the frequency of a term in a document and its rarity across all documents. For example, if the term "banana" appears frequently in a document but rarely in the entire corpus, it will have a high TF-IDF score for that document. Vectorization using Word2Vec may include representing each word in a high-dimensional vector space based on the context in which it appears. Documents are represented as the average or sum of the Word2Vec embeddings of all the words in the document. For example, "apple" might be represented as [0.2, 0.3, −0.1, . . . ], and a document containing "apple banana" might be represented as the average of the two vectors. Vectorization using Doc2Vec may extends Word2Vec to represent entire documents in a continuous vector space. Each document is represented as a vector, similar to Word2Vec embeddings, capturing the semantic meaning of the document. Doc2Vec can take into account both the words in the document and the context in which they appear. A 60-dimensional vector in Word2Vec refers to the embedding vector generated for each word or document when using Word2Vec with a specified dimensionality of 60. In Word2Vec, each word in a given vocabulary is represented by a dense vector of real numbers (embedding), where the dimensionality of the vector is typically chosen based on the specific application and computational constraints. For example, if a Word2Vec model is trained with a 60-dimensional embedding space, each word in the vocabulary will be represented by a vector of length 60. These vectors capture the semantic meaning of the words in a continuous vector space, allowing for operations like word similarity calculations and vector arithmetic. Similarly, if using Doc2Vec and specifying a 60-dimensional vector space, each document in the corpus will be represented by a 60-dimensional vector capturing its semantic meaning in relation to other documents and words in the corpus. These vectors are learned during the training process of Word2Vec or Doc2Vec models and can be used in downstream natural language processing tasks for tasks like sentiment analysis, document classification, or information retrieval. Vectorization using Bag-of-Words (BoW) may include each document represented as a vector where each element corresponds to the count of a word from the vocabulary in that document. For example, if the vocabulary consists of ["apple", "banana", "orange"], and a document contains the text "apple banana banana", its BoW representation would be [1, 2, 0] because it has 1 "apple", 2 "banana", and 0 "orange".

Continuing with the prior example, if a Word2Vec vectorization is employed, a 60-D Word2Vec model may be generated based on the 66,500 news articles published online by one or more news outlets (and associated user comments therefore) from Jan. 1, 20217 to Dec. 31, 2023, to generate a 60-D vector for each unique word in the corpus of the 66,500 news articles, and 60-D vector for each article may be generated based on an average of the 60-D vector for each unique word in the article. In some embodiments, the 60-D vectors for articles on a given day (e.g., typically about 50 New York Times articles per day) may be averaged to generate a 60-D vector representation for the day. Thus, for example, numeric representations 210 may include for each day of Jan. 1, 2017 to Dec. 31, 2023, a set of 60-D vectors for the day, with each 60-D vector representing a given one of the articles on that day. Or, for example, numeric representations 210 may include for each day of Jan. 1, 2017 to Dec. 31, 2023, a single 60-D vector for the day, with the 60-D vector representing an average of the 60-D vectors for the articles on that day. As described, in some embodiments, numerical representations 210 of documents 206 may be employed in a transaction modeling operation (e.g., at block 230) to generate a corresponding transaction model 116. For example, generated numerical representations 210 (e.g., 60-D vectors) of documents 206 and associated document characteristics (e.g., document labels 224) may be employed in a transaction modeling operation (e.g., at block 230), to determine a transaction model 116 that is operable to determine a transaction prediction 140 based on a set of numerical representations 210 (e.g., 60-D vectors) for one or more documents and associated document characteristics (e.g., document labels 224) for the one or more documents.

Referring again to structured pathway 220, in some embodiments, historical value extraction 222 includes processing of historical structured transaction data for a time interval of interest to generate a corresponding set of trend labels 224 for respective subsets of historical structured transaction data 150. For example, historical value extraction 222 may include, obtaining time series value data for intervals of interest and, for some or all the intervals of interest, determining a corresponding trend for the interval of interest and associating a corresponding trend label 224 with the interval of interest. Continuing with the above example, historical value extraction 222 may include for each day of the prior seven year interval of interest, from Jan. 1, 2017 to Dec. 31, 2023, determining a corresponding value of item 109 for the interval, such as the opening, closing or average price for that day. For example, where item 109 is Mexican pesos (MXN), historical value extraction 222 may include for each day of the prior seven year interval of interest, from Jan. 1, 2017 to Dec. 31, 2023, determining the corresponding closing "price" of Mexican pesos (MXN) in US dollars (USD) for that day, which may be, for example, the exchange rate of MXN/USD.

In some embodiments, historical value extraction 222 includes determining a trend label for an item 109 for a given time (e.g., a given point in time or a given interval, such as a day), based on values of the item 109 before or after the given time. Continuing with the example of generating a corresponding value of item 109 for a given day, a directional trend for the day may be determined based on a comparison of value(s) of item 109 for a time period before the closing to values of and value(s) of item 109 for a time period after the closing. For example, for each of days over the last seven years (e.g., from Jan. 1, 2017 to Dec. 31, 2023), generating a leading average that is an average of the closing price of Mexican pesos (MXN) in US dollars (USD) for the four preceding days, generating a trailing average that is an average of the price of Mexican pesos (MXN) in US dollars (USD) for the day and the three days following (or "trailing average"), conducting a comparison of the leading average to the trailing average to determine whether the trailing average is greater/less than the leading average, determining an associated trend label 324 for the day is positive/negative if the trailing average for the day is greater/less than the leading average for the day.

Referring again to FIG. 3 (a table diagram that illustrates structured data 300), in the illustrated embodiment, structured data 300 includes structured pricing data arranged in a tabular format (e.g., a column/row structure), where each type of data point (e.g., date and price) is stored in a separate column (e.g., a date column and a price column), and the rows represent individual records or observations (e.g., a date and price for each respective day). The price for a given day may, for example, represent a closing price of Mexican pesos (MXN) in US dollars (USD) for the day (e.g., an exchange rate of MXN/USD at the closing of business on the corresponding day).

FIG. 4 is a diagram that illustrates assessment of structured data 300 in accordance with one or more embodiments. In the illustrated embodiment, an example determination of a leading value and a trailing value, and a corresponding difference therebetween, is shown for a given day. Specifically, a leading average of 1.3200 is determined for Jan. 9, 2024 based on an average of the closing price of the preceding four days, a trailing average of 1.3275 is determined for Jan. 9, 2024 based on an average of the closing price of that day and the following three days, and a difference therebetween (or a "delta") is determined a 0.0075 based on the trailing average minus the leading average. As such, the average of the later values is greater than the average of the earlier values, and a positive trend may be determined for Jan. 9, 2024 based on a positive delta and Jan. 9, 2024 may be associated with a trend label indicative of a positive value trend (e.g., a label of "up" or "positive"). If a negative delta is determined for a given day, that day may be associated with a trend label indicative of a negative value trend (e.g., a label of "down" or "negative").

FIG. 5 is a diagram that illustrates labeled structured 500 data in accordance with one or more embodiments. In the illustrated embodiment, the table include additional columns for leading average (e.g., calculated for each day/row as described with regard to leading average of FIG. 4), trailing average (e.g., calculated for each day/row as described with regard to trailing average of FIG. 4), leading-trailing average (e.g., calculated for each day/row as described with regard to leading-trailing delta of FIG. 4), and a label (e.g., a trend label indicative of a determined positive or negative value trend as described with regard to trailing average of FIG. 4). Notably, the most recent three days may not have enough "trailing" data (e.g., less than three following days) to provide a representative average and thus may be null until additional sets of daily values are obtained.

Referring again to FIG. 2, historical value extraction 222 may include trend determinations similar to that described with regard to FIGS. 3-5, with intervals or particular points in time (e.g., days) labeled with a corresponding trend label. Continuing with the prior example, for example, for each of days over the last seven years (e.g., from Jan. 1, 2017 to Dec. 31, 2023), leading and trailing averages may be determined and compared to determine an associated trend label 324 (e.g., "up" or "down") for each day, and trend labels 224 may include the set of trend labels 324 (e.g., "up" or "down") for those days (e.g., a structured set of data including for each date, a corresponding trend label 224 of "up" or "down").

In some embodiments, transaction modeling 230 includes generating a transaction model 116 based on corresponding sets of generated numeric representations 210 and trend labels 224. Continuing with the prior example, for example, a transaction model 116 may be generated based on artificial intelligence (AI) modeling of a set of numeric representations 210 that include, for each day of the interval from Jan. 1, 2017 to Dec. 31, 2023, a single 60-D vector (e.g., representing an average of the 60-D vectors for the articles on that day) and a set of trend labels 324 (e.g., "up" or "down") for value of an item 109 (e.g., an exchange rate, or "price" of MXD in USD) for each day of the interval from Jan. 1, 2017 to Dec. 31, 2023. In some embodiments, a transaction model 116 generated based on corresponding sets of generated numeric representations 210 and trend labels 224 is operable to determine transaction predictions 140 (e.g., a predicted trend "up" or "down" of the value of an associated item 109) based on application of numeric representations 210 of current transaction data 132 to the transaction model 116. For example, again continuing with the prior example, the generated transaction model 116 (or "MXD/USD valuation" transaction model 116) may be operable to generate a predicted trend for the value of MXD to USD (e.g., an exchange rate of MXD to USD) over a given future period of time, such as the next four days. As described, such predictions may enable operators to make informed decisions regarding the in the purchase and sale of the corresponding item (e.g., purchase MXD in USD today, followed by a sale of the MXD four days later, for example, effectuated by a purchase of USD using the MXD purchased four days earlier) or an associated item.

In some embodiments, transaction model 116 is a machine learning model layered into either a neural net or liquid net. For example, transaction model 116 may be a machine learning model employing one or more trained machine learning algorithms that are operable to determine value trends for an item 109 that are trained based on historical structured data 150, such as pricing history, and historical unstructured data 154, such as news articles or other published content. In some embodiments, transaction model 116 employs one or more of a given machine learning algorithms, such as Naive Bayes Classifier, Decision Trees, Support Vector Machines (SVM), K-Nearest Neighbors (KNN), Deep Learning Models, Neural Networks, Recurrent Neural Networks (RNNs), Long Short-Term Memory (LSTM), Gated Recurrent Unit (GRU), Convolutional Neural Networks (CNNs), Transformer Models, Ensemble Learning, Logistic Regression, Gradient Boosting, XGBoost, Unsupervised Clustering, FCM Clustering, Cluster Profiling, Cluster Tagging, Advanced Visualizations, or the like. For example, transaction model 116 may employ a Naive Bayes Classifier model trained using historical transaction data 130, such as an historical unstructured transaction data 154 or historical structured transaction data 150, to determine a value trend for an item 109 based on application of current transaction data 132, such as current structured transaction data 152 and current unstructured transaction data 156, to the transaction model 116.

Concerning the above-described machine learning algorithms, a given algorithm may be implemented based on its operation and characteristics. For example, Naive Bayes classification may assume independence between features, which may make it suitable for simple datasets with categorical features. Decision tree modeling may recursively split data based on feature values, which may make it effective for capturing complex decision-making processes with both categorical and numerical features. SVM modeling may find a hyperplane that maximally separates classes in a high-dimensional space, which may make it beneficial when a clear margin of separation exists. KNN modeling may classify a data point based on the majority class of its k nearest neighbors, which may benefit tasks emphasizing local similarity. Deep learning models may employ training artificial neural networks with many layers (hence "deep") to perform complex tasks such as image and speech recognition, natural language processing, and more. Deep learning models may be capable of automatically learning hierarchical representations of data, making them highly effective for tasks that require understanding of high-level abstractions. Neural network modeling may create layers of interconnected nodes to learn hierarchical representations, which may be suitable for capturing complex, non-linear relationships in large datasets. Liquid networks, or liquid neural networks, may employ a type of neural network where the connectivity and parameters of the network can dynamically change over time. These networks may be designed to adapt to new information and changing environments in real-time, making them suitable for tasks that require flexibility and continual learning, where the fluid (or "liquid") nature allows the network to self-organize and reconfigure its structure based on the data it processes, which can improve performance on dynamic, non-static problems. Ensemble learning may combine predictions from multiple models to enhance overall performance, which may utilize techniques like bagging or boosting to boost accuracy and robustness. Logistic regression modeling may model the probability that a given instance belongs to a particular category, which may make it useful for problems requiring a probabilistic interpretation. Gradient boosting may build trees sequentially, with each tree correcting the errors of the previous ones and may be effective for combining weak learners to create a strong predictive model. XGBoost may be an ensemble learning technique suitable for handling both historical data and current availability features. Unsupervised Clustering may be a method where the AI system groups data points into clusters based on similarities without pre-labeled categories or guidance, allowing for the identification of inherent patterns or structures within the data. FCM Clustering (Fuzzy C-Means Clustering) may be an AI technique that assigns each data point to one or more clusters with varying degrees of membership, providing a more nuanced grouping compared to hard clustering methods. Cluster Profiling may be a process where the AI system characterizes and summarizes the properties or attributes of each identified cluster, providing insights into the defining features of the groupings. Cluster Tagging may be the practice of labeling or annotating the identified clusters with meaningful tags or descriptors, facilitating easier interpretation and understanding of the different groupings by end-users. Advanced Visualization may be a technique used by AI systems to present complex data and insights through visually engaging and intuitive formats, enhancing the ability to perceive and comprehend intricate patterns and relationships in the data.

In some embodiments, training of transaction models 116 includes pre-processing of historical transaction data 130 or other transaction model training data used to train the models 116, including historical unstructured transaction data 154 and historical structured transaction data 150, used to train a transaction model 116. This may include, for example, removing irrelevant information (e.g., filtering out data that is not relevant to the model's objectives), standardizing data formats (e.g., converting data from various sources into a standard format), handling missing data (e.g., addressing gaps in the data, either by filling in missing values with estimated figures or by excluding incomplete records), data normalization (e.g., scaling the data to a specific range or format), natural language processing ("NLP") techniques (e.g., parsing language, identifying key phrases or sentiment, and categorizing content based on context), and noise reduction (e.g., removing or minimizing inconsistencies and random fluctuations in the data that can lead to inaccuracies in a transaction model 116 output). In some embodiments, a transaction model 116 is designed to integrate the pre-processing and processing steps into a single, unified operation.

In some embodiments, training of a transaction model 116 includes splitting transaction model training data, such as historical transaction data 130, into a training data subset, a validation data subset, and a testing data subset. In such an embodiment, the training dataset may be used to train the machine learning model. During this phase, the model may learn patterns and relationships within the data. For example, the algorithm may process the training data, adjusting its parameters to minimize differences between its predicted output and the actual target values. This may be an iterative process that continues until the model achieves satisfactory performance. The validation dataset may be used to fine-tune the model and optimize its hyperparameters. This may provide an independent dataset not used during training to assess how well the model generalizes to new, unseen data. During this phase, after each training iteration, the model's performance is evaluated on the validation set. Based on this evaluation, hyperparameters (e.g., learning rate, regularization, etc.) may be adjusted to improve performance without overfitting to the training data. The testing dataset may be used to assess the model's final performance and generalization to new, unseen data. It may provide an unbiased evaluation of the model's ability to make predictions on data it has never encountered before. During this phase, the model, with its optimized parameters, may be evaluated on the testing set, and its performance metrics (e.g., accuracy, precision, recall, etc.) may be calculated. This evaluation may help to estimate how well the model is expected to perform on new, real-world data. Such evaluations and fine-tune may provide relatively accurate models and associated predictions. For example, models may reach accuracies of 80% or better, which can improve over time with supplemental training data and retraining.

Although embodiments, are described with reference to certain types of training data, modeling, and predictions (or "forecasting") for certain types of items 109, transaction modeling 230 may be conducted, and associated transaction models 116 may be generated, for various types of items 109 or context. For instance, an embodiment may include generation of a "wheat valuation" transaction model 116 that is trained on a set of trend labels 224 generated based on pricing history for wheat and historical unstructured data, such as news articles, and be used to provide forward looking predictions of the pricing of wheat, which, for example, can be used to inform when to purchase or sell inventory of wheat or related items. Although certain embodiments are described in the context of using news articles (and associated vectors) as an input vector for transaction model 116, other embodiments may employ any suitable combinations of one or more inputs, such as social media post, or other digital media from online content providers, such as news agencies, social media sites, weather data, or the like, in any suitable format.

In some embodiments, transaction assessment 240 includes application of current structured transaction data 152 or current unstructured transaction data 156 to a transaction model 116, to generate a corresponding transaction prediction 140. Continuing with the prior example, for example, for a given day of Mar. 21, 2024, transaction assessment 240 may include application of current structured transaction data 152, such as one or more of the most recent closing prices of Mexican pesos (MXN) in US dollars (USD) for the last four days (e.g., the exchange rate of MXN/USD at the closing of business for each of the preceding four days) and current unstructured transaction data 156, such as news articles published online by one or more news outlets (and associated user comments therefore)

over the last four days to a generated transaction model 116 operable to predict the trend of the exchange rate of MXN/USD over the following four days, to generate a corresponding transaction prediction 140, such as an indication of a predicted trend of the exchange rate of MXN/USD over the following four days, which may, in turn, be used as a basis for conducting or not conducting a transaction involving item 109. Continuing with the example, responsive to a transaction prediction 140 indicating that the exchange rate of MXD to USD is going to increase over the next four days, operator 106 may, based on the indication, place an order in currency exchange transaction environment 108 to purchase 130 Mexican pesos (MXN) using $100 US dollars (USD) at a current exchange rate of MXN/USD, and sell the Mexican pesos (MXN) in exchange for US dollars (USD) in four days at the exchange rate of MXN/USD at that time. In contrast, responsive to a transaction prediction 140 indicating that the exchange rate of MXD to USD is going to decrease over the next four days, operator 106 may, based on the indication, place an order in currency exchange transaction environment 108 to sell Mexican pesos (MXN) for US dollars (USD) at a current exchange rate of MXN/USD, or plan to buy the Mexican pesos (MXN) in exchange for US dollars (USD) in four days at the exchange rate of MXN/USD at that time.

Figure 6:
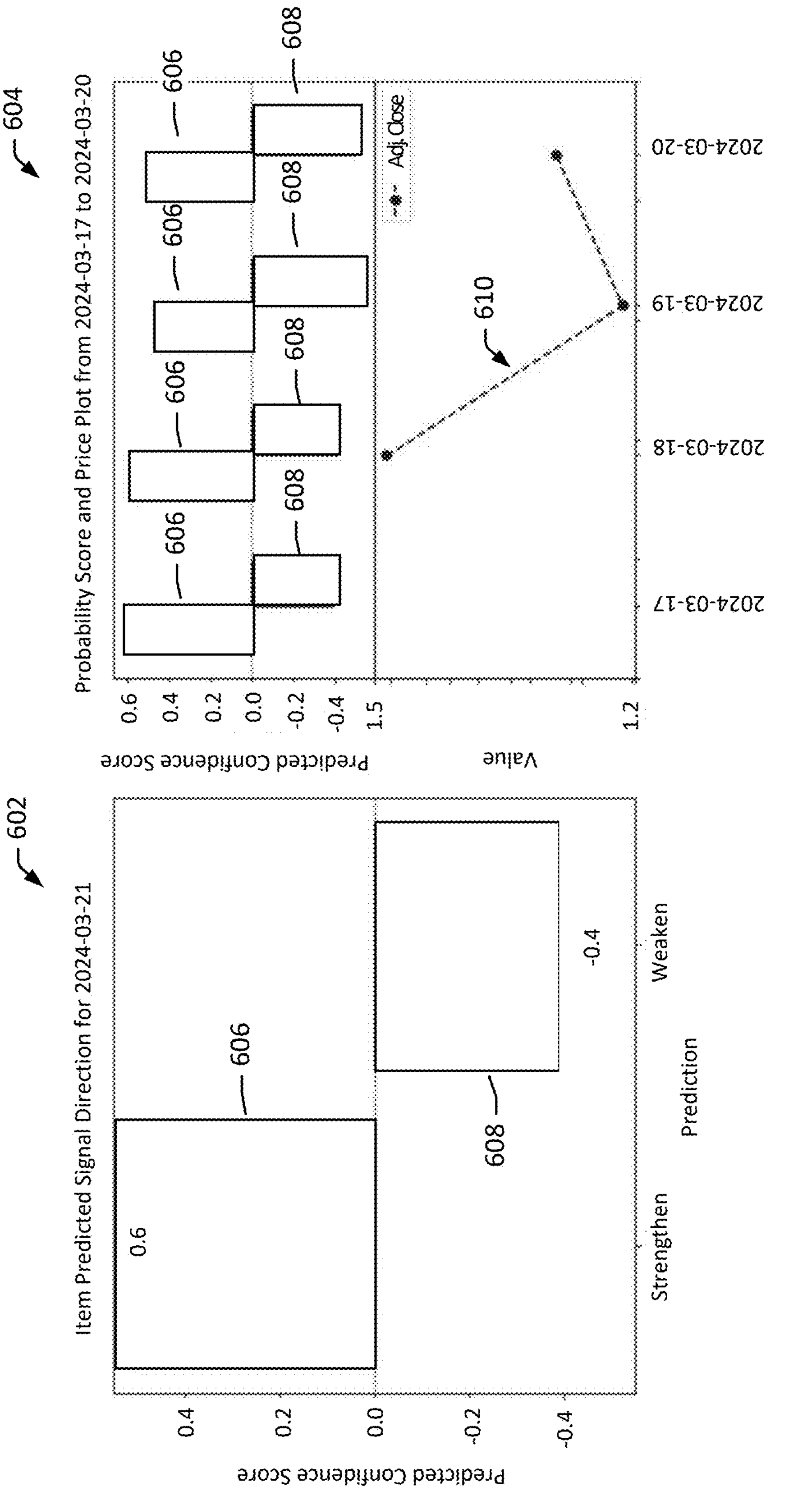
FIG. 6 is a diagram that illustrates transaction prediction data in accordance with one or more embodiments.

FIG. 6 is a diagram that illustrates transaction prediction data 600 in accordance with one or more embodiments. Transaction prediction data 600 may, for example, include or otherwise correspond to a transaction prediction 140. A transaction prediction 140 may, for example, include or otherwise corresponding to transaction prediction data 600, or the like. Such data may, for example, be presented in a graphical user interface (GUI) of a computer, such as that of transaction management system 102 (e.g., a display of a GUI viewable to operator 106). In the illustrated embodiment, transaction prediction data 600 includes a daily item prediction signal direction 602 for a given date (e.g., Mar. 21, 2024), and historical item prediction signal direction 604 for set of preceding set dates (e.g., Mar. 7, 2024-Mar. 20, 2024). Each prediction includes an indication of a prediction for a value of an item, including a "strengthen" prediction 606 and a "weaken" prediction 608, including a corresponding confidence score for the value to trend in a corresponding direction (e.g., a probability of the value going up or down). In the daily item prediction signal direction 602, for example, the "strengthen" prediction 606 indicates a 60% probability that the value of an associated item 109 will increase, and the "weaken" prediction 608 indicates a 40% probability that the value of an associated item 109 will decrease. Such a prediction may indicate a determination that the value of an associated item 109 is going to increase over a corresponding period of time. Continuing with the example of an exchange rate of MXD to USD, may indicate a prediction that the exchange rate of MXD to USD is going to increase over the next four days. As described, based on such a positive indication, operator 106 may place an order in currency exchange transaction environment 108 to purchase 130 Mexican pesos (MXN) using $100 US dollars (USD) at a current exchange rate of MXN/USD, with a plan to sell the Mexican pesos (MXN) in exchange for US dollars (USD) in four days at the exchange rate of MXN/USD at that time. In the historical item prediction signal direction 604, for example, the "strengthen" predictions 606 indicate recent historical daily predicted probabilities that the value of an associated item 109 will increase, and the "weaken" prediction 608 indicates historical daily predicted probabilities that the value of the associated item 109 will increase. In the illustrated embodiment, recent historical item prediction signal direction 604 also includes a plot of actual (or "observed") closing prices 610 for the associated item 109. Such a historical record of predictions along with observed values may provide for tracking the accuracy of past predictions and, thereby, enable an operator to make even more informed purchase decisions for the associated item. For example, where the past several predictions have been accurate at least a threshold number of times, operator 106 may proceed to purchase or sell in accordance with the daily item prediction signal direction 602 (e.g., transact with the current transaction prediction 140). In contrast, where the past several predictions have been inaccurate more than a threshold number of times, operator 106 may not proceed to purchase or sell in accordance with the current transaction prediction 140, as indicated by the daily item prediction signal direction 602 (e.g., transact against the current transaction prediction 140).

Figure 7:
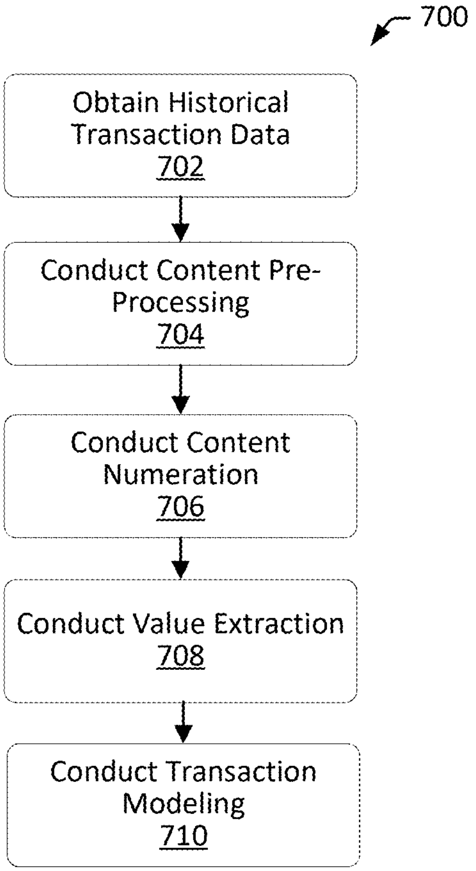
FIG. 7 is a flowchart diagram that illustrates a method of transaction modeling in accordance with one or more embodiments.

FIG. 7 is a flowchart diagram that illustrates a method 700 of transaction modeling in accordance with one or more embodiments. Some or all of the procedural elements of method 700 may be performed, for example, by transaction engine 110 or another entity.

Method 700 may include obtaining historical transaction data (block 702). This may include obtaining historical transaction data that includes historical structured transaction data or historical unstructured transaction data. For example, obtaining historical transaction data may include training module 122 obtaining, from a structured data source 160, such as a forex market website that provides a daily closing price for item 109, historical structured transaction data 150 that includes daily closing prices for item 109 (e.g., closing exchange rate for MXD/USD) for Jan. 1, 2017 to Jan. 13, 2024, and obtaining, from an unstructured data sources 162, such as one or more news outlets, historical unstructured transaction data 154 that includes news articles published online by the one or more news outlets (and associated user comments therefore) from Jan. 14, 2010 to Dec. 31, 2023.

Method 700 may include conducting content preprocessing (block 704). This may include processing of historical unstructured transaction data for a time interval of interest to generate corresponding processed (or "cleaned") data, such as cleaned documents of textual data. For example, conducting content preprocessing may include training module 122 transforming the document text of each of the 66,500 news articles published online by one or more news outlets (and associated user comments therefore) from Jan. 1, 2017 to Dec. 31, 2023 into a respective pre-processed document (or "clean document") associated with its date of publication. This, for example, may be accomplished as described with regard to at least block 204 of FIG. 2.

Method 700 may include conducting content numeration (block 706). This may include processing pre-processed data (or "clean data") (e.g., "cleaned" documents) to generate corresponding numerical representations thereof, such as document vectors. For example, conducting content numeration may include training module 122 generating, for each day of Jan. 1, 2017 to Dec. 31, 2023, a set of 60-D vectors for the day, with each 60-D vector representing a given one of the articles on that day, or a single 60-D vector for the day, with the 60-D vector representing an average of the 60-D vectors for the articles on that day. This, for example, may be accomplished as described with regard to at least block 208 of FIG. 2.

Method 700 may include conducting value extraction (block 708). This may include processing of historical structured transaction data for a time interval of interest to generate a corresponding set of trend labels for respective subsets of historical structured transaction data, such as price trend labels for each day of the interval of interest. For example, conducting value extraction may include training module 122, for each day of the prior seven year interval of interest, from Jan. 1, 2017 to Dec. 31, 2023, determining a corresponding value of item 109 for the interval, such as the opening, closing or average price for that day. For example, where item 109 is Mexican pesos (MXN), historical value extraction 222 may include for each day of the prior seven year interval of interest, from Jan. 1, 2017 to Dec. 31, 2023, determining the corresponding closing "price" of Mexican pesos (MXN) in US dollars (USD) for that day, which may be, for example, the exchange rate of MXN/USD, generating a leading average that is an average of the closing price of Mexican pesos (MXN) in US dollars (USD) for the four preceding days, generating a trailing average that is an average of the price of Mexican pesos (MXN) in US dollars (USD) for the day and the three days following (or "trailing average"), conducting a comparison of the leading average to the trailing average to determine whether the trailing average is greater/less than the leading average, determining an associated trend label 324 for the day is positive/negative if the trailing average for the day is greater/less than the leading average for the day. This, for example, may be accomplished as described with regard to at least block 222 of FIG. 2.

Method 700 may include conducting transaction modeling (block 710). This may include generating a transaction model based on corresponding sets of generated numeric representations and trend labels. For example, conducting transaction modeling may include training module 122, generating a transaction model 116 based on artificial intelligence (AI) modeling through neural and liquid nets of a set of numeric representations 210 that include, for each day of the interval from Jan. 1, 2017 to Dec. 31, 2023, a single 60-D vector (e.g., representing an average of the 60-D vectors for the articles on that day) and a set of trend labels 324 (e.g., "up" or "down") for value of an item 109 (e.g., an exchange rate, or "price" of MXD in USD) for each day of the interval from Jan. 1, 2023 to Dec. 31, 2023. In some embodiments, the transaction model 116 generated is operable to determine transaction predictions 140 (e.g., a predicted trend "up" or "down" of the value of an associated item 109) based on application of numeric representations 210 of current transaction data 132 to the transaction model 116. Again, continuing with the prior example, the generated transaction model 116 may be operable to generate a predicted trend for the value of MXD to USD (e.g., an exchange rate of MXD to USD) over a given future period of time, such as the next four days. This, for example, may be accomplished as described with regard to at least block 230 of FIG. 2. As described, transactions predictions made using transaction model 116 may enable operators to make informed decisions regarding the in the purchase and sale of the corresponding items (e.g., as described here with regard to at least method 800).

Figure 8:
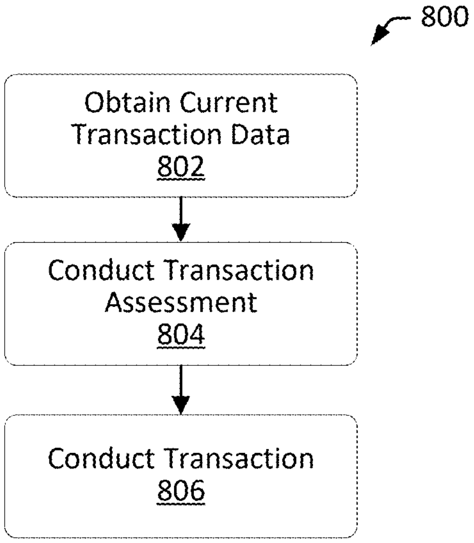
FIG. 8 is a flowchart diagram that illustrates a method of conducting transactions in accordance with one or more embodiments.

FIG. 8 is a flowchart diagram that illustrates a method 800 of conducting transactions in accordance with one or more embodiments. Some or all of the procedural elements of method 800 may be performed, for example, by transaction engine 110, operator 106, transaction environment 108, or another entity.

Method 800 may include obtaining current transaction data (block 802). This may include obtaining transaction data that includes current structured transaction data or current unstructured transaction data. For example, obtaining current transaction data for a given day of Mar. 21, 2024 may include assessment module 124 obtaining, from a structured data source 160, such as a forex market website that provides a daily closing exchange rate for MXD/USD, current structured transaction data 152 that includes one or more of the most recent daily closing prices of Mexican pesos (MXN) in US dollars (USD) for the last four days (e.g., the exchange rate of MXN/USD at the closing of business for each of the preceding four days) and current unstructured transaction data 156 that includes news articles published online by one or more news outlets (and associated user comments therefore) over the last four days.

Method 800 may include conducting transaction assessment (block 804). This may include application of current structured transaction data or current unstructured transaction data to a transaction model, to generate a corresponding transaction prediction. For example, conducting a transaction assessment may include assessment module 124 applying, to a transaction model 116 (e.g., transaction model 116 generated at block 710), current structured transaction data 150 that includes the most recent daily closing prices of Mexican pesos (MXN) in US dollars (USD) for the last four days and current unstructured transaction data 156 that includes the news articles published online by one or more news outlets (and associated user comments therefore) over the last four days, to generate, to generate a corresponding transaction prediction 140, such as an indication of a predicted trend of the exchange rate of MXN/USD over the following four days. This, for example, may be accomplished as described with regard to at least block 240 of FIG. 2.

Method 800 may include conducting a transaction (block 806). This may include conducting a transaction based on a transaction prediction, such as a price trend of up or down for the coming days. For example, conducting a transaction may include operator 106 (or another entity, such as transaction engine 110) purchasing or not purchasing MXD based on a predicted trend of the exchange rate of MXD/USD provided in a transaction prediction 140, such as that illustrated in transaction prediction data 600 of FIG. 6. Continuing with the example, responsive to a transaction prediction 140 indicating that the exchange rate of MXD to USD is going to increase over the next four days, conducting a transaction may include operator 106 (or another entity, such as transaction engine 110), based on the indication, placing an order in currency exchange transaction environment 108 (e.g., a Forex) to purchase Mexican pesos (MXN) using $100 US dollars (USD) at a current exchange rate of MXN/USD (e.g., and to sell the Mexican pesos (MXN) in exchange for US dollars (USD) in four days at the exchange rate of MXN/USD at that time). In contract, responsive to a transaction prediction 140 indicating that the exchange rate of MXD to USD is going to decrease over the next four days, conducting a transaction may include operator 106 (or another entity, such as transaction engine 110), based on the indication, placing an order in currency exchange transaction environment 108 to sell Mexican pesos (MXN) for US dollars (USD) at a current exchange rate of MXN/USD (e.g., with a plan to buy the Mexican pesos (MXN) in exchange for US dollars (USD) in four days at the exchange rate of MXN/USD at that time).

Figure 9:
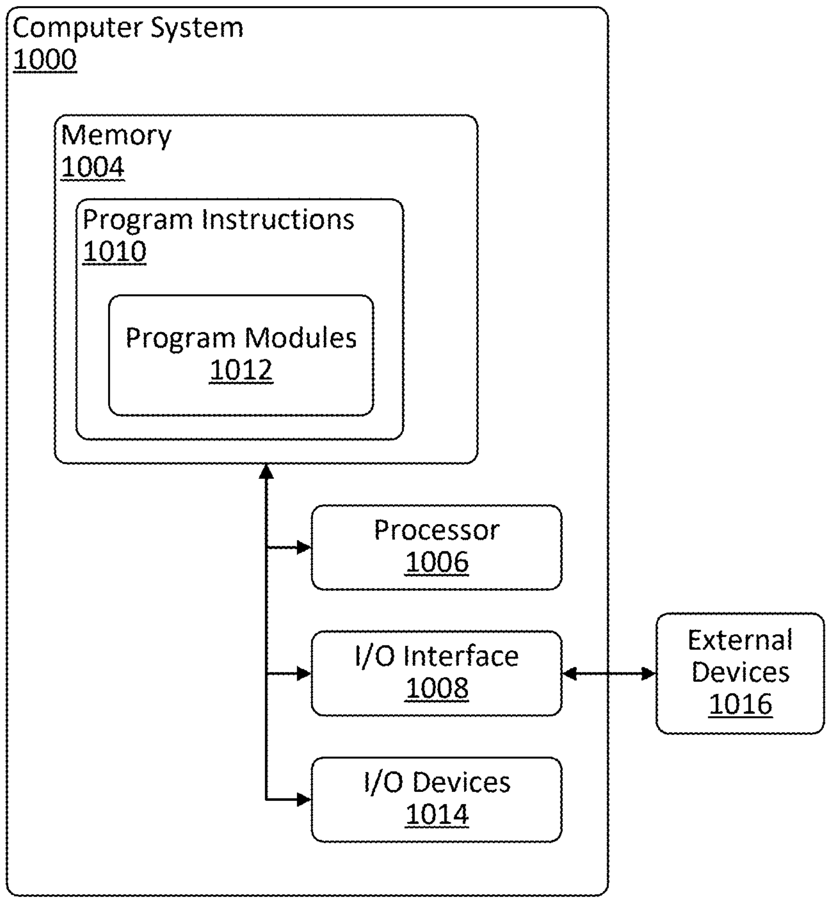
FIG. 9 is a diagram that illustrates an example computer system in accordance with one or more embodiments.

FIG. 9 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored on the medium. The program instructions 1010 may include program modules 1012 that are executable by a computer processor (e.g., the processor 1006) to cause the functional operations described, such as those described with regard to the entities described (e.g., management system 102, transaction engine 110, training module 122, transaction assessment module 124, data sources 104, operator 106), operational aspects of environment 108, operational aspects of transaction system 102, method 700 or 800.

The processor 1006 may be any suitable processor capable of executing program instructions. The processor 1006 may include one or more processors that carry out program instructions (e.g., the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different processing cores to generate a simulation of a reservoir. The I/O interface 1008 may provide an interface for communication with one or more I/O devices 1014, such as a joystick, a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, computer systems, servers or electronic communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. An item transaction system comprising:
   - a transaction database configured to store transaction data comprising:
     - structured transaction data received from a structured transaction data source and indicative of values of an item over a time interval of interest; and unstructured transaction data received from an unstructured transaction data source, and comprising datasets published over the time interval of interest; and a transaction engine comprising non-transitory computer readable storage medium comprising program instructions stored thereon that are executable by a processor to perform the following operations for conducting item transactions:

generating, based on the structured transaction data, a historical structured transaction dataset corresponding to the time interval of interest, the historical structured transaction dataset comprising timeseries data comprising a value for the item for each of a plurality of discrete points in time across the time interval of interest;

determining, based on the historical structured dataset, a set of historical directional values for the time interval of interest, the set of historical directional values comprising, for each of the plurality of discrete points in time, a directional value that is indicative of a trend of the value of the item for a time interval that extends from a given leading time before the discrete point in time to a given trailing time after the discrete point in time;

generating, based on the unstructured transaction data, a historical unstructured transaction dataset corresponding to the time interval of interest, the historical unstructured transaction dataset comprising datasets published over the time interval of interest and associated with one or more of the discrete points in time;

determining, for each dataset of the datasets, a numerical representation of the dataset;

determining, based on the set of historical directional values and the numerical representations of the datasets, a transaction model configured to determine a predicted direction of value for the item based on current structured transaction data and current unstructured transaction data;

obtaining a current transaction dataset comprising:

a current structured transaction dataset associated with a given point in time; and a current unstructured transaction dataset associated with the given point in time; and determining, based on application of the current structured transaction dataset and the current unstructured transaction dataset to the transaction model, a predicted direction of value for the item for the given point in time.

2. The system of embodiment 1, the operations further comprising:

executing, based on the predicted direction of value for the item for the given point in time, a transaction to acquire or divest of the item.

3. The system of embodiment 1 or embodiment 2, wherein:

the structured transaction data indicative of values for the item over the time interval of interest comprises price history for the item over the time interval of interest; and the datasets published over the time interval of interest comprises textual data of documents published over the time interval of interest.

4. The system of embodiment 3, wherein the documents published over the time interval of interest comprises publicly available digital media.

5. The system of any one of embodiments 1-4, wherein:

the structured transaction data indicative of values for the item over the time interval of interest comprises price history for the item over the time interval of interest, and determining the set of historical directional values for the time interval of interest comprises:

for each of a plurality of discrete points in time across the time interval of interest:

determining, for a leading time interval preceding the point in time, a leading value;

determining, for a trailing time interval preceding the point in time, a trailing value;

determining whether the trailing value is greater or less than the leading value;

determining, in response to determining that the trailing value is greater the leading value, a positive directional value that is indicative of a positive trend of the value for the item at the point in time; and determining, in response to determining that the trailing value is less than the leading value, a negative directional value that is indicative of a positive trend of the value for the item at the point in time.

6. The system of any one of embodiments 1-5, wherein the directional value indicates a confidence level for the directional value.

7. The system of any one of embodiments 1-6, wherein the datasets published over the time interval of interest comprises published textual documents published over the time interval of interest; and determining a numerical representation of a dataset comprises:

preprocessing textual data of an associated textual document to generate a pre-processed version of the dataset; and vectorizing the pre-processed version of the dataset to generate a vector representation of the dataset, wherein the numerical representation of the dataset comprises the vector representation of the dataset.

8. The system of any one of embodiments 1-7, wherein determining the transaction model comprises applying a machine learning algorithm to the set of historical directional values and the numerical representation of the dataset to train the transaction model.

9. The system of any one of embodiments 1-8, the operations further comprising:

presenting, for ingestion by a user, the predicted direction of value for the item for the given point in time.

10. The system of any one of embodiments 1-9, wherein the datasets published over the time interval of interest comprise textual datasets.

11. A method for item transactions comprising:

receiving, from a structured transaction data source, structured transaction data indicative of values of an item over a time interval of interest;

generating, based on the structured transaction data, a historical structured transaction dataset corresponding to the time interval of interest, the historical structured transaction dataset comprising timeseries data comprising a value for the item for each of a plurality of discrete points in time across the time interval of interest;

determining, based on the historical structured dataset, a set of historical directional values for the time interval of interest, the set of historical directional values comprising, for each of the plurality of discrete points in time, a directional value that is indicative of a trend of the value of the item for a time interval that extends from a given leading time before the discrete point in time to a given trailing time after the discrete point in time;

receiving, from an unstructured transaction data source, unstructured transaction data comprising datasets published over the time interval of interest;

generating, based on the unstructured transaction data, a historical unstructured transaction dataset corresponding to the time interval of interest, the historical unstructured transaction dataset comprising datasets published over the time interval of interest and associated with one or more of the discrete points in time;

determining, for each dataset of the datasets, a numerical representation of the dataset;

determining, based on the set of historical directional values and the numerical representations of the datasets, a transaction model configured to determine a predicted direction of value for the item based on current structured transaction data and current unstructured transaction data;

obtaining a current transaction dataset comprising:

a current structured transaction dataset associated with a given point in time; and a current unstructured transaction dataset associated with the given point in time; and determining, based on application of the current structured transaction dataset and the current unstructured transaction dataset to the transaction model, a predicted direction of value for the item for the given point in time.

12. The method of embodiment 11, further comprising:

executing, based on the predicted direction of value for the item for the given point in time, a transaction to acquire or divest of the item.

13. The method of embodiment 11 or embodiment 12, wherein:

the structured transaction data indicative of values for the item over the time interval of interest comprises price history for the item over the time interval of interest; and the datasets published over the time interval of interest comprises textual data of documents published over the time interval of interest.

14. The method of embodiment 13, wherein the documents published over the time interval of interest comprises publicly available digital media.

15. The method of any one of embodiments 11-14, wherein:

the structured transaction data indicative of values for the item over the time interval of interest comprises price history for the item over the time interval of interest, and determining the set of historical directional values for the time interval of interest comprises:

for each of a plurality of discrete points in time across the time interval of interest:

determining, for a leading time interval preceding the point in time, a leading value;

determining, for a trailing time interval preceding the point in time, a trailing value;

determining whether the trailing value is greater or less than the leading value;

determining, in response to determining that the trailing value is greater the leading value, a positive directional value that is indicative of a positive trend of the value for the item at the point in time; and determining, in response to determining that the trailing value is less than the leading value, a negative directional value that is indicative of a positive trend of the value for the item at the point in time.

16. The method of any one of embodiments 11-15, wherein the directional value indicates a confidence level for the directional value.

17. The method of any one of embodiments 11-16, wherein the datasets published over the time interval of interest comprises published textual documents published over the time interval of interest; and determining a numerical representation of a dataset comprises:

preprocessing textual data of an associated textual document to generate a pre-processed version of the dataset; and vectorizing the pre-processed version of the dataset to generate a vector representation of the dataset, wherein the numerical representation of the dataset comprises the vector representation of the dataset.

18. The method of any one of embodiments 11-17, wherein determining the transaction model comprises applying a machine learning algorithm to the set of historical directional values and the numerical representation of the dataset to train the transaction model.

19. The method of any one of embodiments 11-18, further comprising:

presenting, for ingestion by a user, the predicted direction of value for the item for the given point in time.

20. The method of any one of embodiments 11-19, wherein the datasets published over the time interval of interest comprise textual datasets.

21. A non-transitory computer readable storage medium comprising program instructions stored thereon that are executable by a processor to perform the method of any one of embodiments 11-21.

22. A method for item transactions comprising:

obtaining, from a structured transaction data source, structured transaction data indicative of values of an item over a time interval;

generating, based on the structured transaction data, a historical structured transaction dataset corresponding to the time interval;

determining, based on the historical structured dataset, a set of historical directional values for the time interval;

receiving, from an unstructured transaction data source, unstructured transaction data comprising datasets published over the time interval;

generating, based on the unstructured transaction data, a historical unstructured transaction dataset corresponding to the time interval;

determining, for the datasets, numerical representations of the dataset;

determining, based on the set of historical directional values and the numerical representations of the datasets, a transaction model configured to determine a predicted direction of value for the item based on current structured transaction data and current unstructured transaction data; and determining, based on application of current structured transaction data and current unstructured transaction data to the transaction model, a predicted direction of value for the item for a given point in time.

23. The method of embodiment 22, wherein:

the historical structured transaction dataset comprising timeseries data comprising a value for the item for each of a plurality of discrete points in time across the time interval of interest;

the set of historical directional values comprising, for each of the plurality of discrete points in time, a directional value that is indicative of a trend of the value of the item for a time interval that extends from a given leading time before the discrete point in time to a given trailing time after the discrete point in time; and the historical unstructured transaction dataset comprising datasets published over the time interval of interest and associated with one or more of the discrete points in time.

24. The method of claim 22, wherein the datasets published over the time interval comprise textual datasets.

25. A non-transitory computer readable storage medium comprising program instructions stored thereon that are executable by a processor to perform the method of any one of embodiments 22-24.

26. An item transaction system comprising:

a transaction engine comprising non-transitory computer readable storage medium comprising program instructions stored thereon that are executable by a processor to perform the method of any one of embodiments 22-24.

What is claimed is:

1. An item transaction system comprising:

a transaction database configured to store transaction data comprising:

structured transaction data received from a structured transaction data source and indicative of values of an item over a time interval of interest; and unstructured transaction data received from an unstructured transaction data source, and comprising datasets published over the time interval of interest; and a transaction engine comprising non-transitory computer readable storage medium comprising program instructions stored thereon that are executable by a processor to perform the following operations for conducting item transactions:

generating, based on the structured transaction data, a historical structured transaction dataset corresponding to the time interval of interest, the historical structured transaction dataset comprising timeseries data comprising a value for the item for each of a plurality of discrete points in time across the time interval of interest;

determining, based on the historical structured dataset, a set of historical directional values for the time interval of interest, the set of historical directional values comprising, for each of the plurality of discrete points in time, a directional value that is indicative of a trend of the value of the item for a time interval that extends from a given leading time before the discrete point in time to a given trailing time after the discrete point in time;

generating, based on the unstructured transaction data, a historical unstructured transaction dataset corresponding to the time interval of interest, the historical unstructured transaction dataset comprising datasets published over the time interval of interest and associated with one or more of the discrete points in time, the datasets being associated with respective ones of the discrete points in time;

determining numerical representations of the historical unstructured transaction dataset, wherein determining the numerical representations comprises:

for each dataset of the datasets, vectorizing content of the dataset to generate a dataset vector representative of the content of the dataset; and for each of the respective ones of the discrete points in time:

identifying a set of dataset vectors corresponding to one or more datasets associated with the discrete point in time; and generating, based on the set of dataset vectors, a point-in-time vector representation for the discrete point in time;

determining, based on the set of historical directional values and the numerical representations of the historical unstructured transaction datasets, a transaction model configured to determine a predicted direction of value for the item based on current structured transaction data and a current numerical representation generated from current unstructured transaction data, the determining comprising training the transaction model using, for the respective ones of the discrete points in time, the point-in-time vector representation for the discrete point in time and a corresponding directional value of the set of historical directional values;

obtaining a current transaction dataset comprising:

a current structured transaction dataset associated with a given point in time; and a current unstructured transaction dataset associated with the given point in time, the current unstructured transaction dataset comprising one or more current datasets associated with the given point in time;

generating a current numerical representation of the current unstructured transaction dataset based on vectorization of content of the one or more current datasets; and determining, based on application of the current structured transaction dataset and the current numerical representation of the current unstructured transaction dataset to the transaction model, a predicted direction of value for the item for the given point in time.

2. The system of claim 1, the operations further comprising:

executing, based on the predicted direction of value for the item for the given point in time, a transaction to acquire or divest of the item.

3. The system of claim 1, wherein:

the structured transaction data indicative of values for the item over the time interval of interest comprises price history for the item over the time interval of interest; and the datasets published over the time interval of interest comprises textual data of documents published over the time interval of interest.

4. The system of claim 3, wherein the documents published over the time interval of interest comprises publicly available digital media.

5. The system of claim 1, wherein:
the structured transaction data indicative of values for the item over the time interval of interest comprises price history for the item over the time interval of interest, and
determining the set of historical directional values for the time interval of interest comprises:
for each of a plurality of discrete points in time across the time interval of interest:
determining, for a leading time interval preceding the point in time, a leading value;
determining, for a trailing time interval including or following the point in time, a trailing value;
determining whether the trailing value is greater or less than the leading value;
determining, in response to determining that the trailing value is greater than the leading value, a positive directional value that is indicative of a positive trend of the value for the item at the point in time; and
determining, in response to determining that the trailing value is less than the leading value, a negative directional value that is indicative of a negative trend of the value for the item at the point in time.

6. The system of claim 1, wherein the directional value indicates a confidence level for the directional value.

7. The system of claim 1, wherein
the datasets published over the time interval of interest comprise published textual documents published over the time interval of interest; and
vectorizing textual content of a dataset comprises:
preprocessing textual data of an associated textual document to generate a pre-processed version of the textual data; and
vectorizing the pre-processed version of the textual data to generate the dataset vector.

8. The system of claim 1, wherein determining the transaction model comprises applying a machine learning algorithm to the point-in-time vector representations and corresponding directional values of the set of historical directional values.

9. The system of claim 1, the operations further comprising:
presenting, for ingestion by a user, the predicted direction of value for the item for the given point in time.

10. A method for item transactions comprising:
receiving, from a structured transaction data source, structured transaction data indicative of values of an item over a time interval of interest;
generating, based on the structured transaction data, a historical structured transaction dataset corresponding to the time interval of interest, the historical structured transaction dataset comprising timeseries data comprising a value for the item for each of a plurality of discrete points in time across the time interval of interest;
determining, based on the historical structured dataset, a set of historical directional values for the time interval of interest, the set of historical directional values comprising, for each of the plurality of discrete points in time, a directional value that is indicative of a trend of the value of the item for a time interval that extends from a given leading time before the discrete point in time to a given trailing time after the discrete point in time;
receiving, from an unstructured transaction data source, unstructured transaction data comprising datasets published over the time interval of interest;
generating, based on the unstructured transaction data, a historical unstructured transaction dataset corresponding to the time interval of interest, the historical unstructured transaction dataset comprising datasets published over the time interval of interest and associated with one or more of the discrete points in time, the datasets being associated with respective ones of the discrete points in time;
determining numerical representations of the historical unstructured transaction dataset, wherein determining the numerical representations comprises:
for each dataset of the datasets, vectorizing content of the dataset to generate a dataset vector representative of the content of the dataset; and
for each of the respective ones of the discrete points in time,
identifying a set of dataset vectors corresponding to one or more datasets associated with the discrete point in time; and
generating, based on the set of dataset vectors, a point-in-time vector representation for the discrete point in time;
determining, based on the set of historical directional values and the numerical representations of the historical unstructured transaction datasets, a transaction model configured to determine a predicted direction of value for the item based on current structured transaction data and a current numerical representation generated from current unstructured transaction data, the determining comprising training the transaction model using, for the respective ones of the discrete points in time, the point-in-time vector representation for the discrete point in time and a corresponding directional value of the set of historical directional values;
obtaining a current transaction dataset comprising:
a current structured transaction dataset associated with a given point in time; and
a current unstructured transaction dataset associated with the given point in time, the current unstructured transaction dataset comprising one or more current datasets associated with the given point in time;
generating a current numerical representation of the current unstructured transaction dataset based on vectorization of content of the one or more current datasets; and
determining, based on application of the current structured transaction dataset and the current numerical representation of the current unstructured transaction dataset to the transaction model, a predicted direction of value for the item for the given point in time.

11. The method of claim 10, further comprising:
executing, based on the predicted direction of value for the item for the given point in time, a transaction to acquire or divest of the item.

12. The method of claim 10, wherein:
the structured transaction data indicative of values for the item over the time interval of interest comprises price history for the item over the time interval of interest; and
the datasets published over the time interval of interest comprises textual data of documents published over the time interval of interest.

13. The method of claim 12, wherein the documents published over the time interval of interest comprises publicly available digital media.

14. The method of claim 10, wherein:
the structured transaction data indicative of values for the item over the time interval of interest comprises price history for the item over the time interval of interest, and
determining the set of historical directional values for the time interval of interest comprises:
for each of a plurality of discrete points in time across the time interval of interest:
determining, for a leading time interval preceding the point in time, a leading value;
determining, for a trailing time interval including or following the point in time, a trailing value;
determining whether the trailing value is greater or less than the leading value;
determining, in response to determining that the trailing value is greater than the leading value, a positive directional value that is indicative of a positive trend of the value for the item at the point in time; and
determining, in response to determining that the trailing value is less than the leading value, a negative directional value that is indicative of a negative trend of the value for the item at the point in time.

15. The method of claim 10, wherein the directional value indicates a confidence level for the directional value.

16. The method of claim 10, wherein
the datasets published over the time interval of interest comprises published textual documents published over the time interval of interest; and
vectorizing textual content of a dataset comprises:
preprocessing textual data of an associated textual document to generate a pre-processed version of the textual data; and
vectorizing the pre-processed version of the textual data to generate the dataset vector.

17. The method of claim 10, wherein determining the transaction model comprises applying a machine learning algorithm to the point-in-time vector representations and corresponding directional values of the set of historical directional values.

18. The method of claim 10, further comprising:
presenting, for ingestion by a user, the predicted direction of value for the item for the given point in time.

19. A non-transitory computer readable storage medium comprising program instructions stored thereon that are executable by a processor to perform the following operations for item transactions:
receiving, from a structured transaction data source, structured transaction data indicative of values of an item over a time interval of interest;
generating, based on the structured transaction data, a historical structured transaction dataset corresponding to the time interval of interest, the historical structured transaction dataset comprising timeseries data comprising a value for the item for each of a plurality of discrete points in time across the time interval of interest;
determining, based on the historical structured dataset, a set of historical directional values for the time interval of interest, the set of historical directional values comprising, for each of the plurality of discrete points in time, a directional value that is indicative of a trend of the value of the item for a time interval that extends from a given leading time before the discrete point in time to a given trailing time after the discrete point in time;
receiving, from an unstructured transaction data source, unstructured transaction data comprising datasets published over the time interval of interest;
generating, based on the unstructured transaction data, a historical unstructured transaction dataset corresponding to the time interval of interest, the historical unstructured transaction dataset comprising datasets published over the time interval of interest and associated with one or more of the discrete points in time, the datasets being associated with respective ones of the discrete points in time;
determining numerical representations of the historical unstructured transaction dataset, wherein determining the numerical representations comprises:
for each dataset of the datasets, vectorizing content of the dataset to generate a dataset vector representative of the content of the dataset; and
for each of the respective ones of the discrete points in time:
identifying a set of dataset vectors corresponding to one or more datasets associated with the discrete point in time; and
generating, based on the set of dataset vectors, a point-in-time vector representation for the discrete point in time;
determining, based on the set of historical directional values and the numerical representations of the historical unstructured transaction datasets, a transaction model configured to determine a predicted direction of value for the item based on current structured transaction data and a current numerical representation generated from current unstructured transaction data, the determining comprising training the transaction model using, for the respective ones of the discrete points in time, the point-in-time vector representation for the discrete point in time and a corresponding directional value of the set of historical directional values;
obtaining a current transaction dataset comprising:
a current structured transaction dataset associated with a given point in time; and
a current unstructured transaction dataset associated with the given point in time, the current unstructured transaction dataset comprising one or more current datasets associated with the given point in time;
generating a current numerical representation of the current unstructured transaction dataset based on vectorization of content of the one or more current datasets; and
determining, based on application of the current structured transaction dataset and the current numerical representation of the current unstructured transaction dataset to the transaction model, a predicted direction of value for the item for the given point in time.

20. A method for item transactions comprising:
obtaining, from a structured transaction data source, structured transaction data indicative of values of an item over a time interval;
generating, based on the structured transaction data, a historical structured transaction dataset corresponding to the time interval, the historical structured transaction dataset comprising timeseries data comprising values of the item for a plurality of discrete points in time across the time interval;
determining, based on the historical structured dataset, a set of historical directional values for the time interval, the set of historical directional values comprising directional values corresponding to respective ones of the plurality of discrete points in time;

receiving, from an unstructured transaction data source, unstructured transaction data comprising datasets published over the time interval;

generating, based on the unstructured transaction data, a historical unstructured transaction dataset corresponding to the time interval, the historical unstructured transaction dataset comprising the datasets published over the time interval, the datasets being associated with respective ones of the discrete points in time;

determining numerical representations of the historical unstructured transaction dataset, wherein determining the numerical representations comprises:

for each dataset of the datasets, vectorizing content of the dataset to generate a dataset vector representative of the content of the dataset; and for each discrete point in time of the respective ones of the discrete points in time:

identifying a set of dataset vectors corresponding to one or more datasets associated with the discrete point in time; and generating, based on the set of dataset vectors, a point-in-time vector representation for the discrete point in time;

determining, based on the set of historical directional values and the numerical representations of the historical unstructured transaction datasets, a transaction model configured to determine a predicted direction of value for the item based on current structured transaction data and a current numerical representation generated from current unstructured transaction data the determining comprising training the transaction model using, for each discrete point in time of the respective ones of the discrete points in time, the point-in-time vector representation for the discrete point in time and a corresponding directional value of the set of historical directional values:

generating the current numerical representation of the current unstructured transaction data, the current unstructured transaction data comprising one or more current datasets associated with a given point in time, based on vectorization of content of the one or more current datasets; and determining, based on application of current structured transaction data and the current numerical representation of the current unstructured transaction data to the transaction model, a predicted direction of value for the item for the given point in time.

21. The method of claim 20, wherein:

the historical structured transaction dataset comprises timeseries data comprising a value for the item for each of a plurality of discrete points in time across the time interval;

the set of historical directional values comprises, for each of the plurality of discrete points in time, a directional value that is indicative of a trend of the value of the item for a time interval that extends from a given leading time before the discrete point in time to a given trailing time after the discrete point in time; and the historical unstructured transaction dataset comprises datasets published over the time interval and associated with one or more of the discrete points in time.

22. The method of claim 21, wherein the datasets published over the time interval comprise textual datasets.

* * * * *